(12) United States Patent
Tan et al.

(10) Patent No.: US 11,769,308 B2
(45) Date of Patent: *Sep. 26, 2023

(54) SYSTEMS AND METHODS OF AUGMENTED REALITY GUIDED IMAGE CAPTURE

(71) Applicant: Wayfair LLC, Boston, MA (US)

(72) Inventors: Nicole Allison Tan, Brookline, MA (US); Rachana Sreedhar, Boston, MA (US); Shrenik Sadalgi, Cambridge, MA (US); Christian Vázquez, Revere, MA (US); Jessica Stigile, Cambridge, MA (US); Ashwin Subramani, Belmont, MA (US); Maria Paula Gomez Muñoz, New York, NY (US)

(73) Assignee: Wayfair LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,400

(22) Filed: Jul. 21, 2022

(65) Prior Publication Data

US 2022/0366658 A1 Nov. 17, 2022

Related U.S. Application Data

(63) Continuation of application No. 17/201,693, filed on Mar. 15, 2021, now Pat. No. 11,430,191.

(Continued)

(51) Int. Cl.
*G06T 19/00* (2011.01)
*G06T 7/70* (2017.01)
(Continued)

(52) U.S. Cl.
CPC .......... *G06T 19/006* (2013.01); *G06T 7/0002* (2013.01); *G06T 7/70* (2017.01);
(Continued)

(58) Field of Classification Search
CPC ....... G06T 19/006; G06T 7/0002; G06T 7/70; G06T 7/80; G06T 19/003; G06T 7/55;
(Continued)

(56) References Cited

U.S. PATENT DOCUMENTS 9,374,517 B2 6/2016 Glasgow
11,430,191 B2 8/2022 Tan et al.
(Continued)

OTHER PUBLICATIONS

[No Author Listed], Apple unveils new iPad Pro with breakthrough LiDAR Scanner and brings trackpad support to iPadOS. Apple, Inc. Mar. 18, 2020. https://www.apple.com/newsroom/2020/03/apple-unveils-new-ipad-pro-with-lidar-scanner-and-trackpad-support-in-ipados/ [last accessed Jan. 12, 2021]. 11 pages.

(Continued)

*Primary Examiner* — Jeffery A Brier
(74) *Attorney, Agent, or Firm* — Wolf, Greenfield & Sacks, P.C.

(57) ABSTRACT

Some embodiments provide a mobile device configured to guide a user, via an augmented reality (AR) interface generated by the mobile device, to capture images of the physical object using a camera of the mobile device. The mobile device may be configured to obtain boundary information indicative of a boundary enclosing the physical object (e.g., a box enclosing the physical object). The mobile device may be configured to use the boundary information to determine positions from which the user is to capture images of the physical object. The mobile device may be configured to guide the user to capture the images using the AR interface by guiding the user to each of the positions in the AR interface (e.g., by generating on or more GUI elements in the AR interface that indicate a position from which the user is to capture an image).

30 Claims, 14 Drawing Sheets

Related U.S. Application Data

(60) Provisional application No. 63/145,462, filed on Feb. 3, 2021.

(51) Int. Cl.
  *G06T 7/00* (2017.01)
  *H04N 9/64* (2023.01)
  *G06T 7/80* (2017.01)
  *H04N 23/12* (2023.01)

(52) U.S. Cl.
  CPC .............. *G06T 7/80* (2017.01); *G06T 19/003* (2013.01); *H04N 9/646* (2013.01); *H04N 23/12* (2023.01)

(58) Field of Classification Search
  CPC .......... G06T 7/12; H04N 9/646; H04N 23/12; H04N 1/6033
  See application file for complete search history.

(56) References Cited

U.S. PATENT DOCUMENTS

| | | |
|---|---|---|
| 2002/0008700 A1 | 1/2002 | Fuki |
| 2013/0335409 A1 | 12/2013 | Yamamoto |
| 2018/0198976 A1 | 7/2018 | Upendran et al. |
| 2019/0279420 A1 | 9/2019 | Moreno et al. |
| 2020/0082168 A1 | 3/2020 | Fathi et al. |
| 2020/0143565 A1 | 5/2020 | Festa |
| 2020/0302686 A1* | 9/2020 | Totty .......................... G06T 7/50 |
| 2021/0133995 A1* | 5/2021 | Farås ......................... G06T 7/55 |
| 2021/0160436 A1* | 5/2021 | Yildirim .............. H04N 5/2625 |
| 2022/0245900 A1 | 8/2022 | Tan et al. |

OTHER PUBLICATIONS

[No Author Listed], Canvas by Occipital. Occipital, Inc. 2020. https://canvas.io/ [last accessed Jan. 11, 2021]. 12 pages.

[No Author Listed], Capture: 3D Scan Anything. Apple, Inc. 2021. https://apps.apple.com/US/app/capture-3d-scan-anything/id1444183458 [last accessed Jan. 15, 2021]. 3 pages.

[No Author Listed], Case Study: Taking Photographs With a Phone. Etsy, Inc. May 29, 2017. https://www.etsy.com/seller-handbook/article/case-study-taking-photographs-with-a/144433000334 [last accessed Jan. 17, 2021]. 8 pages.

[No Author Listed], ColorChecker Camera Calibration Software. X-Rite, Incorporated. 2021. https://xritephoto.com/CameraCalibration [last accessed May 28, 2021]. 1 page.

[No Author Listed], From Reviews to Revenue vol. 1. Power Reviews. 2016. https://www.powerreviews.com/wp-content/uploads/2016/04/Northwestern-Vo11.pdf [last accessed Jan. 29, 2021]. 1-22.

[No Author Listed], Get camera field of view in iOS 11 ARKit. Stack Overflow. Nov. 28, 2017. https://stackoverflow.com/questions/47536580/get-camera-field-of-view-in-ios-11-arkit [last accessed May 28, 2021]. 4 pages.

[No Author Listed], get pitch, yaw, roll from a CMRotationMatrix. Stack Overflow. Feb. 28, 2012. https://stackoverflow.com/questions/9478630/get-pitch-yaw-roll-from-a-emrotationmatrix [last accessed May 28, 2021]. 3 pages.

[No Author Listed], How to capture 3D scans on your iPhone or iPad using the Matterport Capture app—Part 2. Matterport, YouTube. May 2, 2020. https://www.youtube.com/watch?app=desktop&v=wLIzWD1gru8 [last accessed May 28, 2021]. 16 pages.

[No Author Listed], Model Your World in 3D. Trnio. 2021. https://www.trnio.com/ [last accessed Jan. 10, 2021]. 4 pages.

[No Author Listed], Scanning and Detecting 3D Objects. Apple, Inc. 2021. https://developer.apple.com/documentation/arkit/content_anchors/scanning_and_detecting_3d_objects [last accessed May 28, 2021]. 6 pages.

[No Author Listed], scipy.optimize.brentq. The SciPy community. Apr. 26, 2021. https://docs.scipy.org/doc/scipy/reference/generated/scipy.optimize.brentq.html#scipy.optimize.brentq [last accessed May 28, 2021]. 4 pages.

[No Author Listed], The Ultimate Guide to Product Photography. Etsy, Inc. Jan. 1, 2020. https://www.etsy.com/seller-handbook/article/the-ultimate-guide-to-product/143986679284 [last accessed Jan. 15, 2021]. 3 pages.

[No Author Listed], Tips for Taking Photos that Sell. eBay, Inc. 2020. https://pages.ebay.eom/seller-center/listing-and-marketing/photo-tips.html#tips [last accessed Jan. 15, 2021]. 6 pages.

[No Author Listed], Tools for everything you want to do. Matterport, Inc. 2021. https://matterport.com/3d-capture-applications [last accessed Jan. 20, 2021]. 9 pages.

[No Author Listed], What can I do if my package was damaged? United Parcel Service of America, Inc. 2021. https://www.ups.com/us/en/help-center/sri/damaged-package.page [last accessed Jan. 18, 2021]. 2 pages.

Baldwin. NRf2020: Wayfair's journey to 3D imagery. Essential Retail. Jan. 14, 2024:6 pages. https://web.archive.org/web/20200930053454/https://www.essentialretail.com/news/nrf2020-wayfair-3d-imagery/ [Last accessed Sep. 10, 2021].

Bestor, Boxify. Github. Jul. 12, 2017. https://github.com/alunbestor/Boxify [last accessed May 28, 2021]. 2 pages.

Bock, NRF 2020: Our Key Conclusions on the Value of Stores as Destinations. Valtech Insights. Jan. 26, 2020:7 pages, https://www.valtech.com/insights/nrf-2020-our-key-conclusions-on-the-value-of-stores-as-destinations/ [Last accessed Sep. 10, 2021].

Brennesholtz, 3D and AR Imaging at NRF. Display Daily. 2020. https://www.displaydaily.com/article/display-daily/3d-and-ar-imaging-at-nrf [Last accessed Sep. 10, 2021].

Brent, An Algorithm with Guaranteed Convergence for Finding a Zero of a Function. Algorithms for Minimization Without Derivatives. Prentice-Hall. 1973. Chapter 4:47-60.

Brent, The Use of Successive Interpolation for Finding Simple Zeros of a Function and its Derivatives. Algorithms for Minimization Without Derivatives. Prentice-Hall. 1973. Chapter 3:19-46.

Carter et al., NudgeCam: Toward targeted, higher quality media capture. Proceedings of the 18th ACM international conference on Multimedia. Oct. 25, 2010:615-618.

Chalfen, Snapshot versions of life. Bowling Green State University Popular Press. 1987. 222 pages.

Davidovich, Everything You Need to Know About Product Photography Pricing. Squareshot. Apr. 30, 2020. https://www.squareshot.co/post/everything-you-need-to-know-about-product-photography-pricing [last accessed May 28, 2021]. 22 pages.

Enthed, A retailers way into 3D: IKEA. ACM SIGGRAPH 2013 Studio Talks. Jul. 21, 2013:1 page.

Fan et al., Adoption of augmented reality in online retailing and consumers' product attitude: A cognitive perspective. Journal of Retailing and Consumer Services. Mar. 1, 2020;53:101986. 10 pages.

Fernandez et al., Fast and robust multiple colorchecker detection using deep convolutional neural networks. Image and Vision Computing. Jan. 1, 2019;81:15-24.

Fernandez, colorchecker-detection. GitHub. Jun. 29, 2019. https://github.com/pedrodiamel/colorchecker-detection [last accessed May 28, 2021]. 6 pages.

Freedman, Building ecommerce content you can bank on. Demandware, Inc. 2008. 24 pages.

Herskovitz et al., Opportunities for in-home augmented reality guidance. Extended Abstracts of the 2019 CHI Conference on Human Factors in Computing Systems. May 2, 2019:1-6.

Jarusriboonchai et al., Let's take photos together: exploring asymmetrical interaction abilities on mobile camera phones. Proceedings of the 18th International Conference on Human-Computer Interaction with Mobile Devices and Services. Sep. 6, 2016:529-540.

Jetter et al., Augmented reality tools for industrial applications: What are potential key performance indicators and who benefits?. Computers in Human Behavior. Oct. 1, 2018;87:18-33.

Karlsson, AR: Shipping. Dribbble. 2021. https://dribbble.com/shots/8195589-AR-Shipping [last accessed Jun. 28, 2021]. 10 pages.

Keep, Artist with a camera-phone: A decade of mobile photography. In: Mobile media making in an age of smartphones. Springer. 2014. Berry et al., Eds. Chapter 2:14-24.

(56) References Cited

OTHER PUBLICATIONS

Khakimdjanova et al., Online visual merchandising practice of apparel e-merchants. Journal of Retailing and Consumer Services. Sep. 1, 2005;12(5):307-18.

Kim et al., LetsPic: supporting in-situ collaborative photography over a large physical space. Proceedings of the 2017 CHI Conference on Human Factors in Computing Systems. May 2, 2017:4561-4573.

Kragelund, How to Build Your Own Ecommerce Photography Studio. BigCommerce Pty. Ltd. 2021. https://www.bigcommerce.com/blog/how-to-build-your-own-efficient-ecommerce-photography-studio/#undefined [last accessed Jan. 12, 2021]. 38 pages.

Kuo et al., Luxapose: Indoor positioning with mobile phones and visible light. Proceedings of the 20th annual international conference on Mobile computing and networking. Sep. 7, 2014:447-458.

Lackermair et al., Importance of online product reviews from a consumer's perspective. Advances in economics and business. 2013;1(1):1-5.

Li et al., Guided selfies using models of portrait aesthetics. Proceedings of the 2017 Conference on Designing Interactive Systems. Jun. 10, 2017:179-190.

Liu et al., Evaluating the benefits of real-time feedback in mobile augmented reality with hand-held devices. Proceedings of the SIGCHI Conference on Human Factors in Computing Systems. May 5, 2012:2973-2976.

Lusk et al., Cake Cam: Take Your Photo and Be in it Too. Proceedings of the 21st International Conference on Human-Computer Interaction with Mobile Devices and Services. Oct. 1, 2019:1-9.

Maier et al., The positive effect of contextual image backgrounds on fluency and liking. Journal of Retailing and Consumer Services. Jan. 1, 2018;40:109-16.

Orendorff, The Plague of Ecommerce Return Rates and How to Maintain Profitability. Shopifyplus. Feb. 27, 2019. https://www.shopify.com/enterprise/ecommerce-returns [last accessed Jun. 28, 2021]. 21 pages.

Press et al., Van Wijngaarden-Dekker-Brent Method. In: Numerical Recipes in FORTRAN 77: The Art of Scientific Computing, 2nd ed. Cambridge University Press. 1992. Chapter 9.3;1:352-355.

Rawat et al., ClickSmart: A context-aware viewpoint recommendation system for mobile photography. IEEE Transactions on Circuits and Systems for Video Technology. Apr. 21, 2016;27(1):149-58.

Rawat et al., Context-aware photography learning for smart mobile devices. ACM Transactions on Multimedia Computing, Communications, and Applications (TOMM). Oct. 21, 2015;12(1s):1-24.

Reagan, That sweater you don't like is a trillion-dollar problem for retailers. These companies want to fix it. CNBC. Jan. 12, 2019. https://www.cnbc.com/2019/01/10/growing-online-sales-means-more-returns-and-trash-for-landfills.html [last accessed Jan. 12, 2021]. 7 pages.

Reyes et al., Mixed Reality Guidance System for Motherboard Assembly Using Tangible Augmented Reality. Proceedings of the 2020 4th International Conference on Virtual and Augmented Reality Simulations. Feb. 14, 2020:1-6.

Rodrigues et al., Exploring mixed reality in specialized surgical environments. Proceedings of the 2017 CHI Conference Extended Abstracts on Human Factors in Computing Systems. May 6, 2017:2591-2598.

Rojas-Munoz et al., The System for Telementoring with Augmented Reality (STAR): A head-mounted display to improve surgical coaching and confidence in remote areas. Surgery. Apr. 1, 2020;167(4):724-31.

Rosebrock, Blur detection with OpenCV. PyImageSearch. Sep. 7, 2015. https://www.pyimagesearch.com/2015/09/07/blur-detection-with-opencv/ [last accessed May 28, 2021]. 72 pages.

Salazaar-Gamarra et al., Monoscopic photogrammetry to obtain 3D models by a mobile device: a method for making facial prostheses. Journal of Otolaryngology-Head & Neck Surgery. Dec. 2016;45(1):1-3.

Thees et al., Effects of augmented reality on learning and cognitive load in university physics laboratory courses. Computers in Human Behavior. Jul. 1, 2020;108:106316. 11 pages.

Thomas, The Art and Style of Product Photography. John Wiley & Sons, Inc. 2014:290 pages.

Verma et al., Indoor Navigation Using Augmented Reality. Proceedings of the 2020 4th International Conference on Virtual and Augmented Reality Simulations (ICVARS 2020). 2020:58-63.

Xu et al., Real-time guidance camera interface to enhance photo aesthetic quality. Proceedings of the 33rd annual ACM conference on human factors in computing systems. Apr. 18, 2015:1183-1186.

* cited by examiner

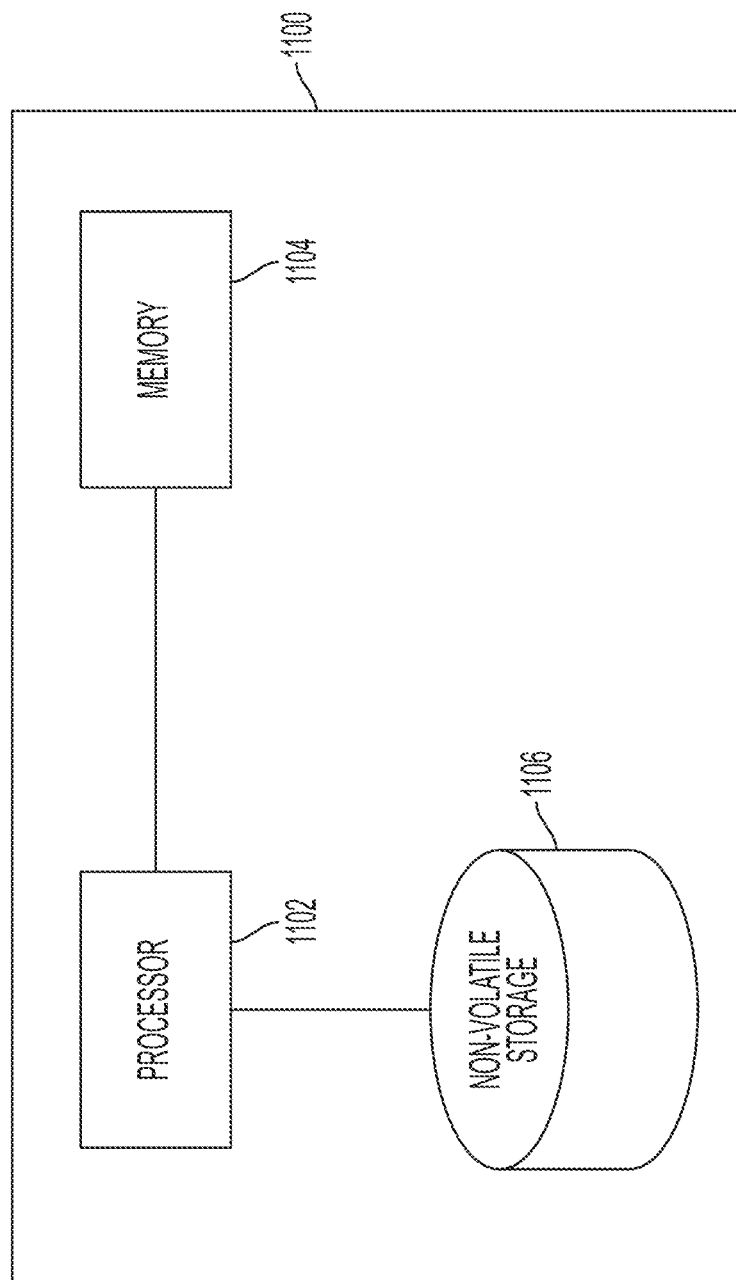

SYSTEMS AND METHODS OF AUGMENTED REALITY GUIDED IMAGE CAPTURE

RELATED APPLICATIONS

This application claims priority under 35 U.S.C. § 120 and is a continuation of U.S. patent application Ser. No. 17/201,693, filed Mar. 15, 2021, titled "SYSTEMS AND METHODS OF AUGMENTED REALITY GUIDED IMAGE CAPTURE," which claims priority under 35 U.S.C. § 119(e) to U.S. Provisional Application 63/145,462 entitled, "SYSTEMS AND METHODS OF AUGMENTED REALITY GUIDED IMAGE CAPTURE," filed Feb. 3, 2021, each of which is incorporated by reference herein in its entirety.

FIELD

This application relates generally to techniques of obtaining images of a physical object by guiding a user to capture the images using augmented reality (AR). Techniques described herein may be used to guide a user to capture images of a physical object (e.g., an article of furniture) that can be used to generate a 3D model of the physical object.

BACKGROUND

One way that businesses inform people about their products is by showing images and/or three dimensional (3D) models of the products. For example, an e-commerce business may display images of its products and/or provide a 3D product model on a webpage. In another example, a business may display images of its products in a catalog. In many cases, consumers decide to purchase a product largely based on images and/or a 3D model of the product, without physically viewing the product. For example, an online furniture retailer may not have any brick and mortar retail locations where customers can view furniture offerings. Thus, a customer may purchase furniture from the online furniture retailer based on the images of furniture provided by the online furniture retailer (e.g., on a website or mobile software application).

SUMMARY

According to some embodiments, a mobile device is provided. The mobile device comprises at least one camera; at least one computer hardware processor; and at least one non-transitory computer-readable storage medium storing processor-executable instructions. The processor-executable instructions, when executed by the at least one computer hardware processor, cause the at least one computer hardware processor to perform a method for guiding a user, via an augmented reality (AR) interface generated by the mobile device, to capture a plurality of images of a physical object using the mobile device, the method comprising: obtaining boundary information indicative of a boundary enclosing the physical object; determining, using the boundary information, a plurality of positions from which the user is to capture the plurality of images, the plurality of positions including a first position from which the user is to capture a first image of the plurality of images; guiding, using the AR interface, the user to capture the plurality of images, the guiding comprising: guiding the user to the first position using the AR interface; determining whether the user can capture the first image by performing at least one quality control test; and in response to determining that the user can capture the first image, enabling the user to capture the first image via the AR interface; and after the plurality of images have been captured by the mobile device, outputting the plurality of images.

According to some embodiments, a method for guiding a user, via an AR interface generated by a mobile device, to capture a plurality of images of a physical object using the mobile device is provided. The method comprises: obtaining boundary information indicative of a boundary enclosing the physical object; determining, using the boundary information, a plurality of positions from which the user is to capture the plurality of images, the plurality of positions including a first position from which the user is to capture a first image of the plurality of images; guiding, using the AR interface, the user to capture the plurality of images, the guiding comprising: guiding the user to the first position using the AR interface; determining whether the user can capture the first image by performing at least one quality control test; and in response to determining that the user can capture the first image, enabling the user to capture the first image via the AR interface; and after the plurality of images have been captured by the mobile device, outputting the plurality of images.

According to some embodiments, a non-transitory computer-readable storage medium storing processor-executable instructions is provided. The instructions, when executed by at least one computer hardware processor of a mobile device, cause the at least one computer hardware processor to perform a method for guiding a user, via an AR interface generated by the mobile device, to capture a plurality of images of a physical object using the mobile device, the method comprises: obtaining boundary information indicative of a boundary enclosing the physical object; determining, using the boundary information, a plurality of positions from which the user is to capture the plurality of images, the plurality of positions including a first position from which the user is to capture a first image of the plurality of images; guiding, using the AR interface, the user to capture the plurality of images, the guiding comprising: guiding the user to the first position using the AR interface; determining whether the user can capture the first image by performing at least one quality control test; and in response to determining that the user can capture the first image, enabling the user to capture the first image via the AR interface; and after the plurality of images have been captured by the mobile device, outputting the plurality of images.

BRIEF DESCRIPTION OF THE DRAWINGS

Various aspects and embodiments will be described herein with reference to the following figures. It should be appreciated that the figures are not necessarily drawn to scale. Items appearing in multiple figures are indicated by the same or a similar reference number in all the figures in which they appear.

FIG. 11 is a block diagram of an example computer system, according to some embodiments of the technology described herein.

DETAILED DESCRIPTION

For many businesses, obtaining high quality images of a product is critical for the success of the business. In particular, high quality images are important for providing customers an accurate description of a product. For example, a furniture retailer may need to provide high quality images of various articles of furniture from multiple different points of view in order to allow customers to learn and appreciate physical features of the articles of furniture. Moreover, high quality images are needed for generating accurate three dimensional (3D) models of products. In order to generate an accurate 3D model of a physical object, a 3D modelling system may need images of the physical object from multiple different views, that each meet a minimum threshold of quality (e.g., in terms of lighting, angle, sharpness, and/or other measures of quality). An accurate 3D product model is important for providing customers with a reliable virtual depiction of a product. For example, a 3D model of an article of furniture may be superimposed in an augmented reality (AR) interface to provide a visualization of the article of furniture in a physical scene (e.g., a room in a home).

Figure 1:
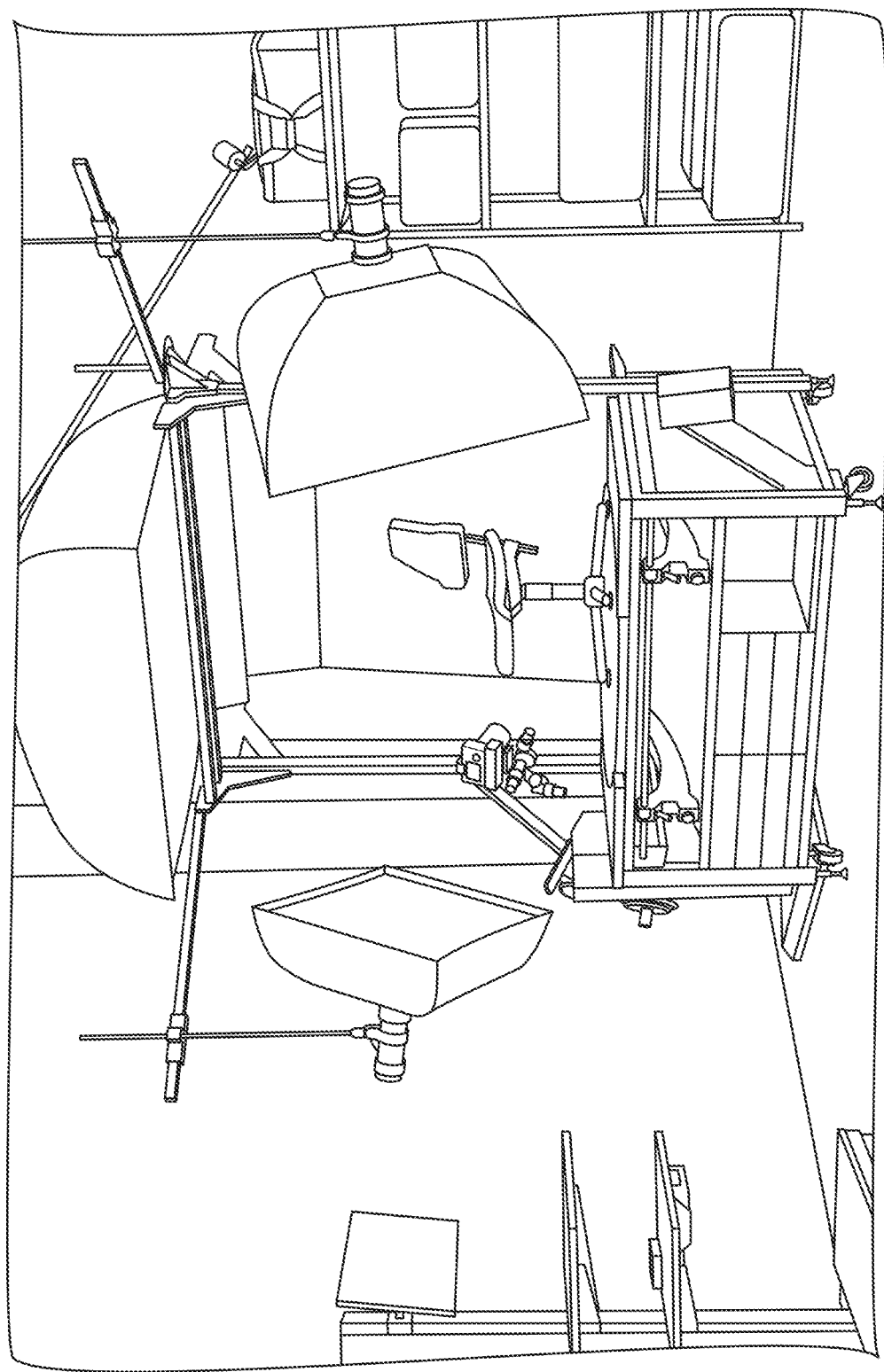
FIG. 1 is an illustration of a photo studio that may be used to obtain images of a physical object.

The inventors have recognized that businesses typically rely on a photo studio to obtain images of products that have the requisite quality for display on a product page and/or for generation of a 3D model of the physical object. FIG. 1 is an illustration of a photo studio for obtaining images of a physical object (e.g., an article of furniture). As shown in FIG. 1, the photo studio includes various lights, cameras, background canvases, computers, and other specialized photography equipment. Moreover, capturing images using the photo studio of FIG. 1 requires employing expert photographers who can capture images that consistently have the requisite quality. A business (e.g., an online furniture store) may source thousands of products from hundreds of different manufacturers located globally. Thus, it is difficult, if not impossible, to obtain images of all products using a photo studio such as one shown in FIG. 1 operated by expert photographers. Information about products (e.g., provided on a product information page) may also include images of products captured by customers. For example, a customer review may include images of a product captured by the customer who posted the review. The inventors have recognized that images captured by users often do not provide accurate depictions of a product. For example, images of a product captured by a customer and posted in a review may not be of sufficient quality to allow viewers of the review to attain an accurate depiction of the product and/or may otherwise mislead the viewers.

To address the above-described challenges in obtaining high quality images, the inventors have developed an augmented reality (AR) based system for guiding users to capture images of a physical object using a mobile device. The system provides real time guidance to a user through an AR interface of the mobile device to guide the user to multiple different positions at which images are captured. The system generates GUI elements (e.g., visual prompts) in the AR interface that guide a user to the positions. The system further provides guidance to the user in how to capture an image at each position such that the image will have a desired level quality (e.g., by guiding camera position, lighting, and/or other determinants of image quality). The system allows a user with a mobile device (e.g., a smartphone) to capture images of a product with quality that would typically require a photo studio (e.g., as shown in FIG. 1) operated by expert photographers to obtain. Thus, the system may allow a business (e.g., an online furniture retailer) to vastly increase the efficiency with which it can obtain high quality images of its products, and 3D product models. For example, the system can be used by each supplier of the business to allow the supplier to provide high quality images of products sourced from the supplier. In another example, the system can be used by customers who have purchased a product to capture images of higher quality than the customer would otherwise be able to capture (e.g., for a review). The system may be used to guide a user to capture images according to a set of rules to obtain a set of images desired for a particular business context. For example, the system may be used to capture images to be provided from a business to a consumer (B2C), a consumer to another consumer (C2C), and/or a consumer to a business (C2B).

Some embodiments provide a mobile device configured to guide a user, via an augmented reality (AR) interface generated by the mobile device, to capture images of the physical object using a camera of the mobile device. The mobile device may be configured to obtain boundary information indicative of a boundary enclosing the physical object (e.g., a box enclosing the physical object). The mobile device may be configured to use the boundary information to determine positions from which the user is to capture images of the physical object. The mobile device may be configured to guide the user to capture the images using the AR interface by guiding the user to each of the positions in the AR interface (e.g., by generating on or more GUI elements in the AR interface that indicate a position from which the user is to capture an image). The mobile device may be configured to perform one or more quality control tests (e.g., of camera position, height, rotation, lighting, and/or other tests) to determine whether the user can capture an image. The mobile device may be configured to enable the user to capture an image at a position (e.g., by generating a selectable GUI element that, when selected, triggers an image capture) when the quality control test(s) are passed. The mobile device may be configured to output the images captured from the different positions. For example, the mobile device may output the images to another computer (e.g., a server) for additional processing and/or generation of a 3D product model. In another example, the mobile device may output the images to another software module on the mobile device to additional processing and/or generation of a 3D product model.

In some embodiments, the mobile device may be a smartphone, a laptop, a tablet, a digital camera, a smartwatch, a virtual reality headset, smart glasses, a smart camera, or any other suitable type of mobile device. As illustrative examples, the mobile device may be the mobile device 204 of FIG. 2A, or the mobile device 704 of FIGS. 7A-B.

In some embodiments, the boundary information may include any suitable information indicative of a boundary enclosing the physical object. For example, the boundary information may include information indicating one or more dimensions (e.g., length, width, depth, height, radius, and/or other dimension(s)) of a two dimensional (2D) or 3D shape enclosing the physical object in 2D or 3D, respectively. In some embodiments, the 3D shape may be a box. In some embodiments, the box may be the smallest volume box enclosing the physical object. However, this need not be the case, and one or more dimensions of the box may be greater than respective dimension(s) of the physical object in some embodiments. The boundary information may be stored in memory in any suitable format, as aspects of the technology described herein are not limited in this respect.

In some embodiments, the boundary may enclose the physical object entirely. However, this need not be the case, and the boundary may enclose the physical object partially in some embodiments. For example, the boundary information may specify a 3D box whose width and height are greater than that of the physical object (thereby fully enclosing the physical object in two dimensions), but whose depth is less than that of the physical object (e.g., because of an error or limited information in the input), which means that the object is only partially enclosed in the third dimension.

In some embodiments, a position from which a user is to capture an image may include a position of the user (also referred to herein as "user position") and a position of a camera of the mobile device (also referred to herein as "camera position"). In some embodiments, the user position may include a location of the user at which to capture the image. For example, the location may be where the user is to stand to capture the image. Some embodiments may be configured to guide the user to a determined user position. In some embodiments, the camera position may include a location where the camera is to be placed to capture the image. For example, the camera position may include a location proximate the location of the user where the camera is to be positioned. Some embodiments may be configured to guide placement of the camera to a desired camera position.

In some embodiments, the physical object may comprise furniture. For example, the physical object may be a couch, chair, table, or other article of furniture. The images captured of the article of furniture may be used to generate a 3D model of the article of the furniture. For example, the 3D model of the article of furniture may be used to allow a user to obtain a virtual depiction of the article of furniture in a space in the user's home using an AR interface. In some embodiments, the physical object may comprise an appliance, a vehicle, a sculpture, wall art, clothing, electronic device, jewelry, a toy, or other type of physical object. Some embodiments may apply to any suitable physical object.

Figure 9:
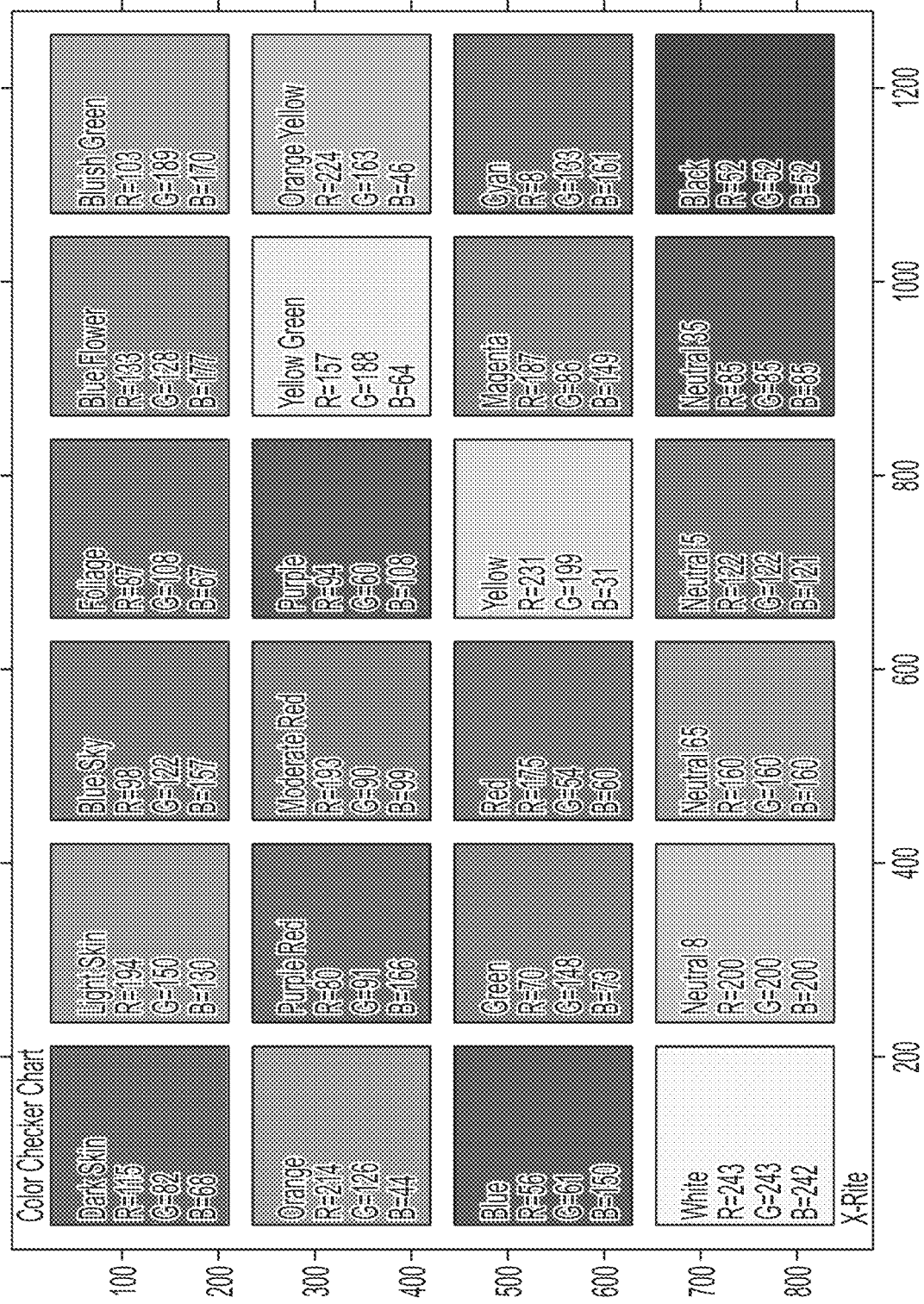
FIG. 9 is an illustration of a color calibration card, according to some embodiments of the technology described herein.

In some embodiments, the mobile device may be configured to guide a user to capture one or more images that can be used to correct color in captured image(s). The mobile device may be configured to guide a user to: (1) position a color calibration target (e.g., a color calibration card as illustrated in FIG. 9) proximate a physical object; and (2) capture a color calibration image of the physical object and the color calibration target. The color calibration image may be used to obtain color correction information which may then be used to correct color in captured image(s) of the physical object. For example, the color calibration image may be used to obtain color correction information by: (1) detecting the color calibration target in the color calibration image; (2) identifying pixels in the color calibration image associated with a color (e.g., a gray square) in the color calibration target; and (3) determining pixel values of the identified pixels. The values of the identified pixels may be used to determine a color correction of the captured image(s). For example, an adjustment to pixel values of the captured image(s) may be determined based on the pixel values of the identified pixels.

Some embodiments of the techniques described herein address all the above-described issues that the inventors have recognized of capturing images of a physical object. However, it should be appreciated that not every embodiment described herein addresses every one of these issues. It should also be appreciated that embodiments of the technology described herein may be used for purposes other than addressing the above-discussed issues of conventional techniques.

Figure 2A:
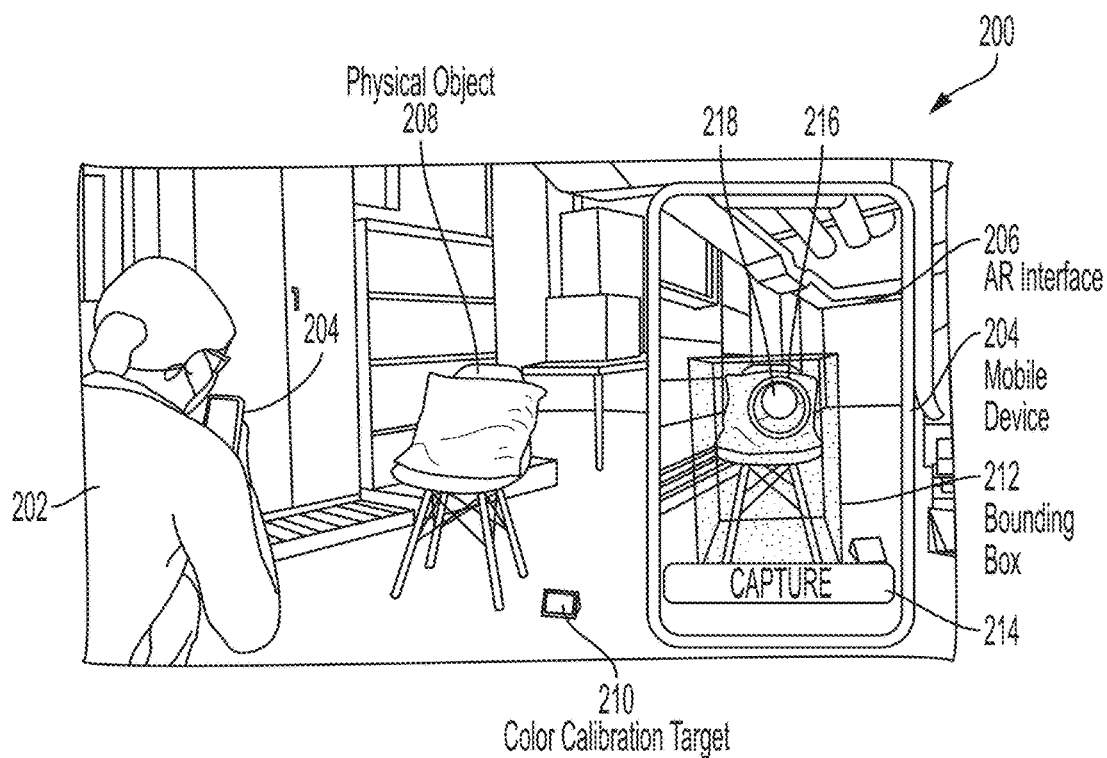
FIG. 2A is an illustration 200 of a user 202 capturing images of a physical object 208 using a mobile device 204 through an AR interface 206 generated by the mobile device, according to some embodiments of the technology described herein.

FIG. 2A is an illustration 200 of a user 202 capturing images of a physical object 208 (e.g., an article of furniture) using a mobile device 204 through an AR interface 206 generated by the mobile device 204, according to some embodiments of the technology described herein. The mobile device 204 may be configured to generate an AR graphical user interface (GUI) interface 206 (also referred to herein as "AR interface") through which the mobile device 204 obtains user input, and guides the user 202 to capture images of the physical object 208.

It should be appreciated that, in contrast to the photo studio shown in FIG. 1 which requires specialized photography equipment and expert photographers to operate the equipment, some embodiments of the technology described herein may allow capturing of high quality images of a physical object 208 using a mobile device 204. The user 202 may be guided to capture images that provide a desired level of quality. For example, a set of images of the physical object 208 captured from different positions may be needed to generate a three dimensional (3D) model of the physical object 208. In another example, a set of images of the physical object 208 may be needed to provide product images on a product information page (e.g., of a website or mobile application). A software application of the mobile device 204 may be configured to use the AR interface 206 to guide the user to capture the set of images that are needed to generate the 3D model and/or provide product images.

As illustrated in FIG. 2A, the user 202 aims a camera of the mobile device 204 such that a field of view of the camera includes the physical object 208. A software application of the mobile device 204 may be configured to generate the AR interface 206. The AR interface 206 may provide an interactive graphical user interface (GUI) through which the user 202 may interact with the AR interface 206. The AR interface 206 may be generated using an AR system of the mobile device 204. For example, the AR system may be APPLE's ARKIT for IOS, or GOOGLE's ARCORE for ANDROID, or any other suitable AR system. A software application may be configured to use the AR system to generate the AR interface 206 shown in the display of the mobile device 204. The AR interface 206 may be configured to superimpose virtual objects in a field of view of a physical scene captured by a camera of the mobile device 204.

Figure 4C:
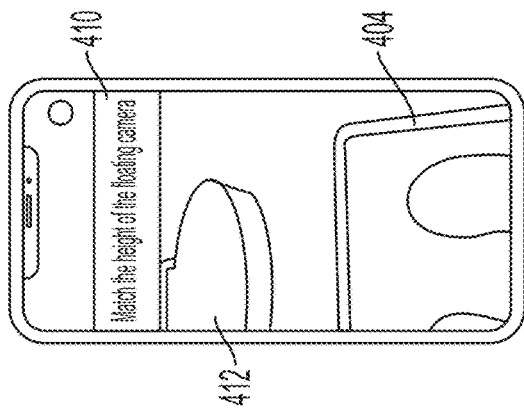
FIG. 4C is an illustration of an example AR interface showing an indication of a height at which to position a camera to capture the image of the physical object, according to some embodiments of the technology described herein.

In some embodiments, a software application of the mobile device 204 may be configured to determine one or more positions from which a user is to capture images of the physical object 208. In some embodiments, each of the positions may include a location relative to the physical object 208 that provides a respective view of the physical object 208. The software application may be configured to use the AR interface 206 to guide the user 202 to the one or more positions. In some embodiments, the software application may be configured to guide a user 202 to a position by generating a GUI element (e.g., a sign labeled "STAND HERE" as shown in FIG. 4B) marking a user position in the AR interface 206. The user may reach the position by moving to the GUI element in the AR interface 206. At each position, the software application may be configured to guide a user to capture an image. The software application may be configured to use the AR interface 206 to indicate a camera position for a camera of the mobile device 204 to capture an image. For example, the software application may be configured to use the AR interface 206 to guide the user 202 such that an image captured by the user meets one or more requirements (e.g., in terms of lighting, angle, position, height, and/or other requirements).

As shown in the zoomed in view of the mobile device 204 displaying the AR interface 206, the AR interface 206 generates a bounding box 212 indicative of a boundary that encloses the physical object 208 shown in the field of view of a camera of the mobile device 204. In some embodiments, the bounding box 212 may be generated based on user input (e.g., provided through the AR interface 216). For example, the user may tap points on the AR interface 216 indicating points on a boundary region outside of the physical object 208. In some embodiments, the bounding box 212 may be automatically generated. For example, a software application of the mobile device 204 may use computer vision techniques to identify the physical object 208 in an image displayed in the AR interface 206, and generate the bounding box 212 based on identified physical object 208.

In the example embodiment of FIG. 2A, the AR interface 206 displays a marker 218 indicating an orientation of the mobile device 204. In some embodiments, the marker 218 may be generated by a software application on the mobile device 204 using one or more sensors of the mobile device 204. For example, the software application may use a gyroscope and/or accelerometer to determine a current orientation (e.g., attitude quaternion, pitch, yaw, and/or roll) of the mobile device 204. The marker 218 displayed in the AR interface 206 may be positioned based on an orientation indicated by the sensor(s). Returning to FIG. 2A, the AR interface 206 displays a circle 216 indicating a target for the marker 218. By aligning the marker 218 with the target 216, the user 202 may set the mobile device 204 to a desired orientation at which to capture an image of the physical object 208. The AR interface 206 further displays a GUI element 214 labeled "CAPTURE", which the user 202 may select (e.g., by tapping) to cause a camera of the mobile device 204 to capture an image. In some embodiments, the AR interface 206 may be configured to display the GUI element 214 when it is determined that certain conditions are met (e.g., that the user has positioned and/or placed the camera at a desired position and/or orientation). In some embodiments, the mobile device 204 may be configured to capture an image automatically when the conditions are met. The software application may be configured to perform one or more quality control tests (e.g., as described herein with reference to FIG. 3B) to determine whether the conditions are met. For example, the AR interface 206 may display the GUI element 214 to enable the user 202 to capture of an image when the marker 218 is aligned with the target 216 (e.g., within a boundary of the circle 216).

In the example embodiment of FIG. 2A, the physical scene includes a color calibration target 210 positioned proximate the physical object 208. For example, as shown in FIG. 2A, the color calibration target 210 is positioned on the same surface as the physical object 208 next to the physical object 208. In some embodiments, the color calibration target 210 may be used to correct colors in an image captured by a camera of the mobile device 204 (e.g., of the physical object 208). In some embodiments, the colors in the image may be corrected by applying a color correction algorithm to adjust pixel values of the image using the color calibration target 210 in the image. The color calibration target may be identified in an image, and then used to obtain color correction information (e.g., adjustment in pixel values). The color correction information may then be used to perform color correction on images of the physical object 208 (e.g., captured from one or more positions).

Figure 2B:
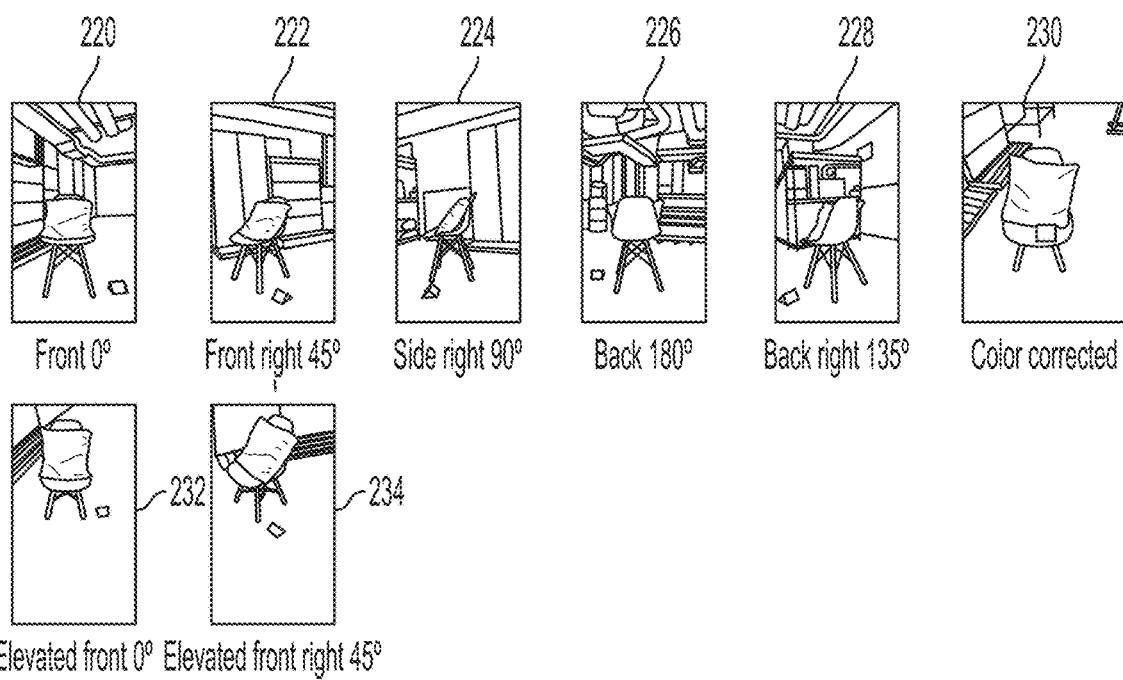
FIG. 2B is an illustration of a plurality of images of the physical object 208 taken from multiple positions using the mobile device 204, according to some embodiments of the technology described herein.

FIG. 2B is an illustration of images of the physical object 208 taken from multiple positions using the mobile device 204, according to some embodiments of the technology described herein. The images shown in FIG. 2B may be taken by the user 202 by following guidance provided through the AR interface 206 by a software application of the mobile device 204. For example, a software application of the mobile device 204 may be configured to use the AR interface 206 to guide the user to the multiple positions, and to orient the mobile device 204 at each position to capture an image. The images include a first image 220 captured from in front of the physical object 208, a second image 222 captured from the front right of the physical object 208 45 degrees from the position from which the first image 220 was captured, a third image 224 captured from a right side of the physical object 208 at 90 degrees relative to the front of the physical object 208, a fourth image 226 captured from behind the physical object 208 at 180 degrees relative to the front of the physical object 208, and a fifth image 228 captured from the back right of the physical object 208 at 135 degrees. The images also include images captured from varying heights. For example, the images include a sixth image 232 captured from the front of the physical object 208 from a height elevated relative to the first image 220, and a seventh image 234 of the front right (at 45 degrees) of the physical object 208 from an elevated height relative to the second image 222.

As shown in FIG. 2B, the images also include a color corrected image 230 of the physical object 208. The color corrected image 230 may be obtained by performing color calibration. The color calibration may be performed by using an image of the physical object 208 including a color calibration target 210 (e.g., the sixth image 232 shown in FIG. 2B). For example, the color corrected image 230 may be generated by determining a color correction by applying a color calibration algorithm using a color calibration image that includes the color calibration target 210 to adjust pixel values. A color corrected version may be generated for each of the images 220, 222, 224, 226, 228, 232, 234. An example process for performing color correction on captured images is described herein with reference to FIG. 8.

Figure 2C:
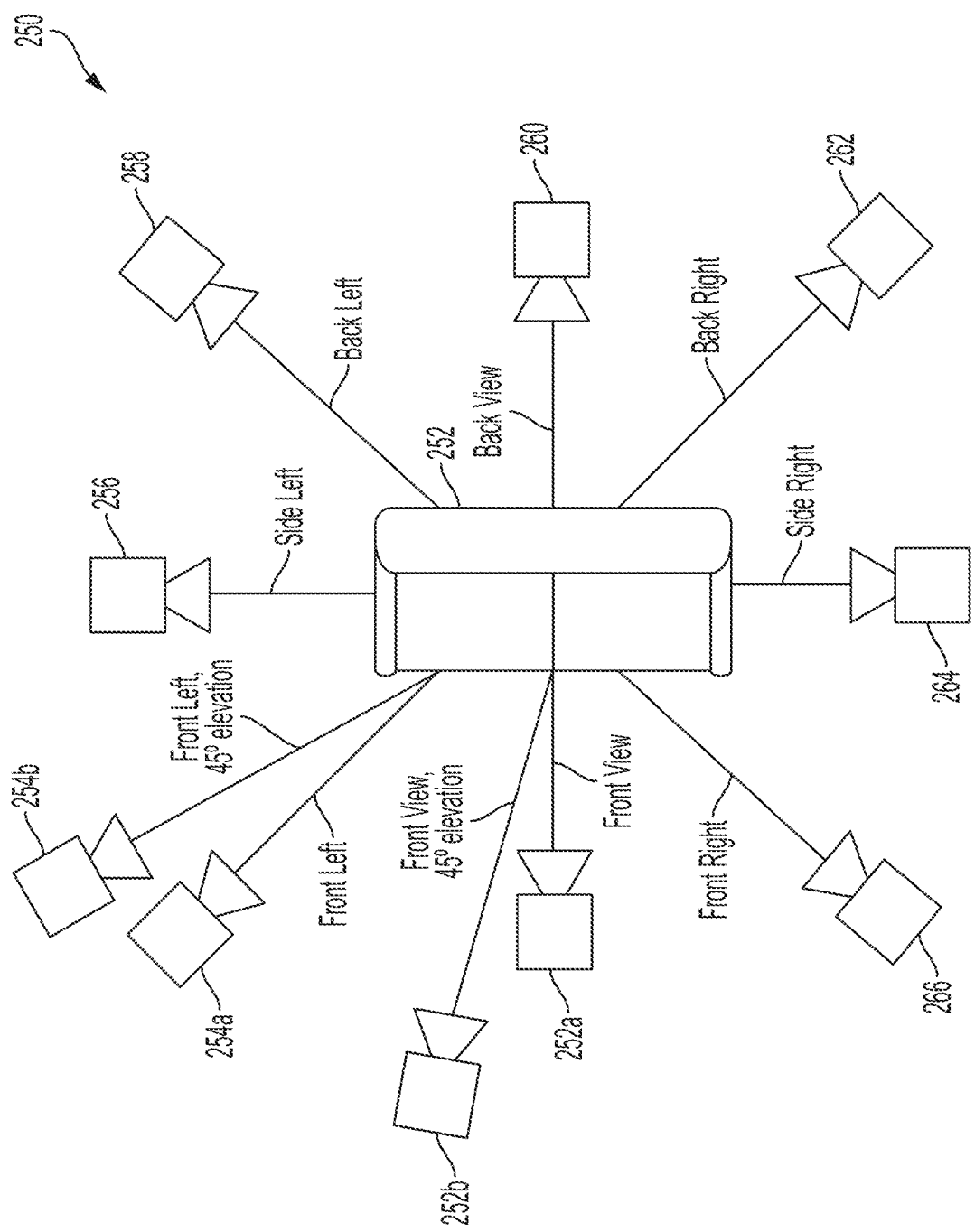
FIG. 2C is a diagram 250 illustrating positions around a physical object 252 from which images may be captured, according to some embodiments of the technology described herein.

FIG. 2C is a diagram 250 illustrating positions around a physical object 252 from which images may be captured, according to some embodiments of the technology described herein. The user 202 shown in FIG. 2A may be guided (e.g., by a software application of the mobile device 204) using the AR interface 206 to one or more of the positions 253a, 253b, 254a, 254b, 256, 258, 260, 262, 264, 266. Each of the positions may provide a respective view of the physical object 252 that is to be captured in an image (e.g., for use in generating a 3D model of the physical object 252). As shown in the example of FIG. 2C, the position 252a provides a front view, position 254a provides a front left view, position 256 provides a side left view, position 258 provides a back left view, position 260 provides a back view, position 262 provides a back right view, position 264 provides a side right view, and position 266 provides a front right view. The user 202 may be guided to position the mobile device 204 at an elevation at a position. For example, as shown in FIG. 2C, at position 252b the mobile device 204 is elevated by 45 degrees relative to the position at position 252a. At position 254b the mobile device 204 is elevated by 45 degrees relative to the position at position 254a.

Figure 3A:
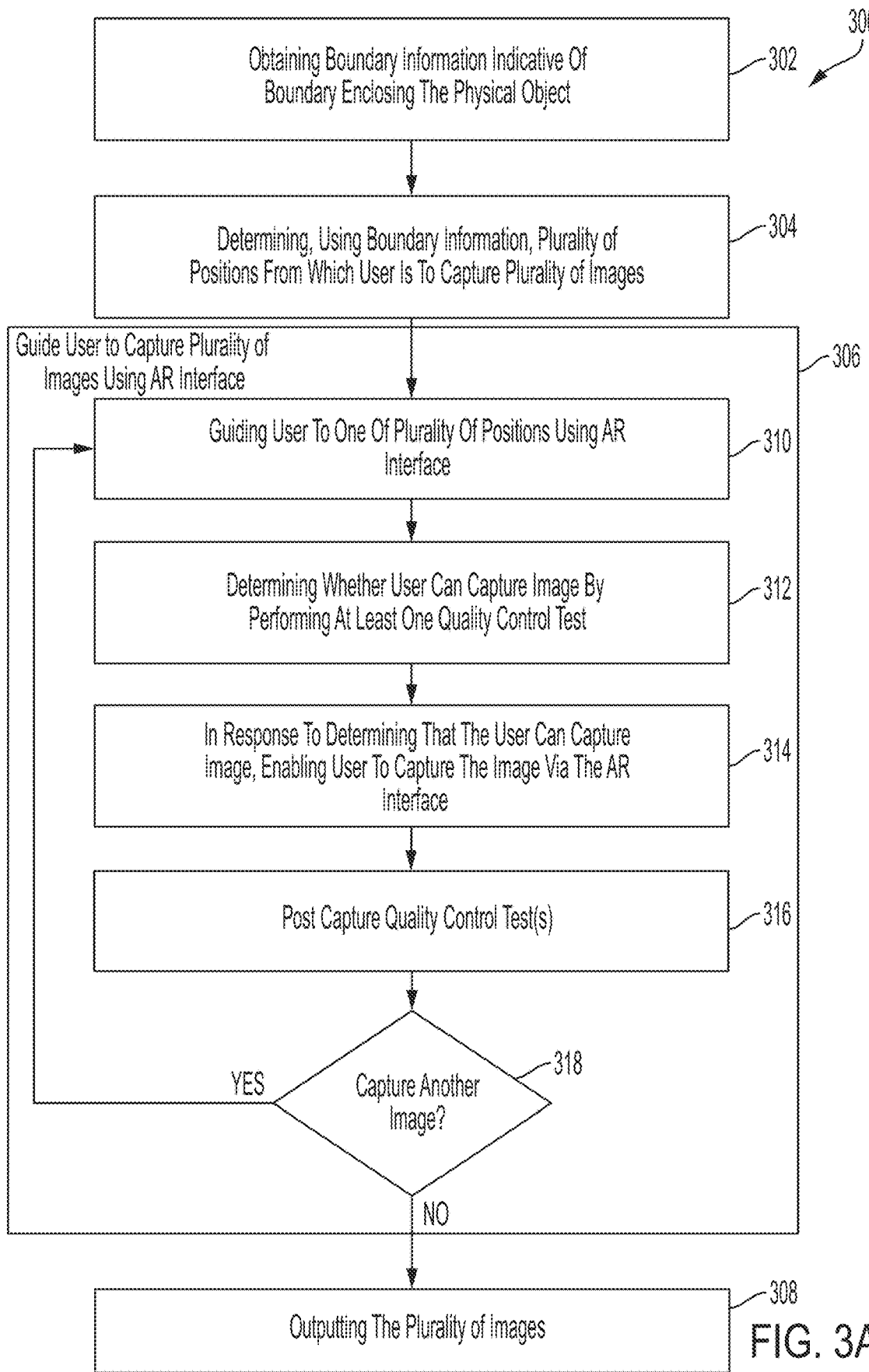
FIG. 3A is a diagram of an illustrative process 300 for obtaining images of a physical object, according to some embodiments of the technology described herein.

FIG. 3A is a diagram of an illustrative process 300 for obtaining images of a physical object (e.g., physical object 208 shown in FIG. 2A), according to some embodiments of the technology described herein. Process 300 may be performed by any suitable computing device. For example, process 300 may be performed by system 720 of mobile device 704 described herein with reference to FIGS. 7A-B.

Process 300 begins at block 302, where the system performing process 300 obtains boundary information indicative of a boundary enclosing the physical object. In some embodiments, the system may be configured to obtain the boundary information based on input provided by a user through an augmented reality (AR) interface. The system may be configured to generate an AR interface through which the user provides input indicating a boundary of the physical object. For example, the system may generate an AR interface in which the user draws a box (e.g., on a touch screen displaying the AR interface) enclosing the physical object displayed in the AR interface. The user may draw a box by tapping three points on a screen indicating three corners of the box (e.g., front left, front right, and back right corners of the box). The system may then allow the user to adjust a height of the box (e.g., by adjusting a slider and/or by dragging a point on the box) such that the box encloses the physical object shown in the AR interface. In another example, the system may allow the user to draw out a rectangle on a surface (e.g., floor) on which the physical object is placed, and then use a GUI element to extend the drawn rectangle into a box enclosing the physical object in the AR interface.

Figure 4F:
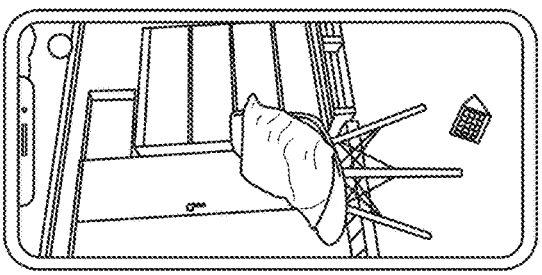
FIG. 4F is an illustration of an image captured using the AR interface shown in FIG. 4E, according to some embodiments of the technology described herein.
Figure 4B:
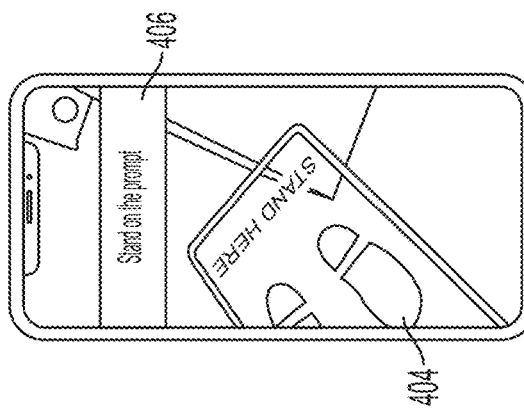
FIG. 4B is an illustration of an example AR interface including a GUI element marking a position at which a user is to stand to capture an image of the physical object, according to some embodiments of the technology described herein.
Figure 4E:
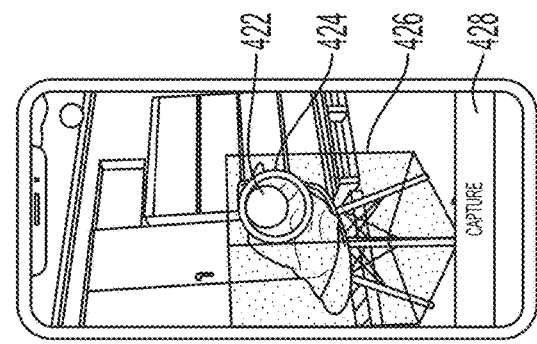
FIG. 4E is an illustration of an example AR interface allowing a user to capture the image after alignment of the mobile device according to the target 422, according to some embodiments of the technology described herein.
Figure 4A:
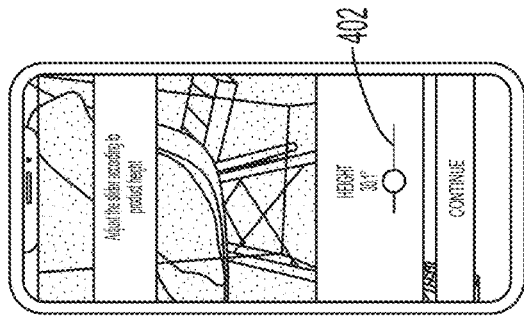
FIG. 4A is an illustration of an example augmented reality (AR) graphical user interface (GUI) displayed on a mobile device through which a user provides input about boundary information for a physical object, according to some embodiments of the technology described herein.

FIG. 4A is an illustration of an example AR graphical user interface (GUI) displayed on a mobile device through which a user provides input about boundary information for a physical object, according to some embodiments of the technology described herein. As shown in FIG. 4A, the AR interface displays a box enclosing a physical object. The AR interface provides a slider 402 which a user may adjust (e.g., by dragging and/or tapping) to set a height of the box. As shown in FIG. 4A, the AR interface may be configured to display a numerical height value set based on the position of the slider 402. The box may be opaque to allow the user to view the physical object in the AR interface relative to the drawn box. In some embodiments, the system may be configured to allow a user to adjust dimensions of a box. For example, the system may generate one or more handles on the drawn box which can be used to adjust respective dimension(s) of the box.

In some embodiments, the system may be configured to use the box drawn in the AR interface to determine boundary information about the physical object. For example, the system may determine an estimated location, orientation, and/or dimensions of the physical object. In some embodiments, the system may be configured to use the box to identify different sides of the physical object. For example, the system may associate a first face of the box with a front of the physical object, a second face of the box with a right side of the physical object, a third face of the box with a left side of the physical object, and a fourth face of the box with a back of the physical object. In some embodiments, the system may be configured to use the box to determine dimensions of the physical object. For example, the system may estimate the length, width, and height of the physical object to be the length, width, and height of the drawn box. In some embodiments, the system may be configured to use the box to determine an orientation of the physical object. For example, the system may use the box to define a rotational axis centered at the physical object.

In some embodiments, the system may be configured to obtain the boundary information indicative of a boundary enclosing the physical object by applying computer vision algorithms to determine the boundary. For example, the system may apply a computer vision algorithm to identify the physical object in the AR interface. The system may then generate a boundary (e.g., a box, sphere, or other shape) around the identified object. In another example, the system may be configured to use machine learning techniques to segment the physical object in the AR interface. The system may then generate a boundary (e.g., a box, sphere, or other shape) around the segmented physical object in the AR interface.

In some embodiments, input provided by a user via an AR interface may be input indicating the user's confirmation of a suggested boundary, which may be suggested to the user through the AR interface. The system may be configured to automatically determine the suggested boundary from an image (e.g., by applying a computer vision algorithm to the image). For example, the system may automatically segment a portion of the AR interface including the physical object and generate a suggested boundary in the portion of the AR interface. The system may display a visualization of the suggested boundary, and request input (e.g., a response to a visual prompt) from the user to confirm the suggested boundary. In some embodiments, the system may be configured to allow the user to modify a suggested boundary. For example, the system may allow the user to modify one or more dimensions of the suggested boundary.

Next, process 300 proceeds to block 304, where the system determines, using the boundary information, a plurality of positions from which a user is to capture a plurality of images. In some embodiments, the system may be configured to determine the plurality of positions by determining, for each position, a respective distance to the physical object from which an image is to be captured, and an angle. For example, the respective distance to the physical object may be measured from a user position. The system may be configured to determine different angles around the physical object from which to capture the images. For example, the system may determine a set of angles around the physical object from which images are to be captured to generate a 3D model of the object. In another example, the system may determine a set of angles around the physical object from which images are to be captured to display on a product information page (e.g., to provide viewers with multiple perspectives of the physical object).

Figure 5:
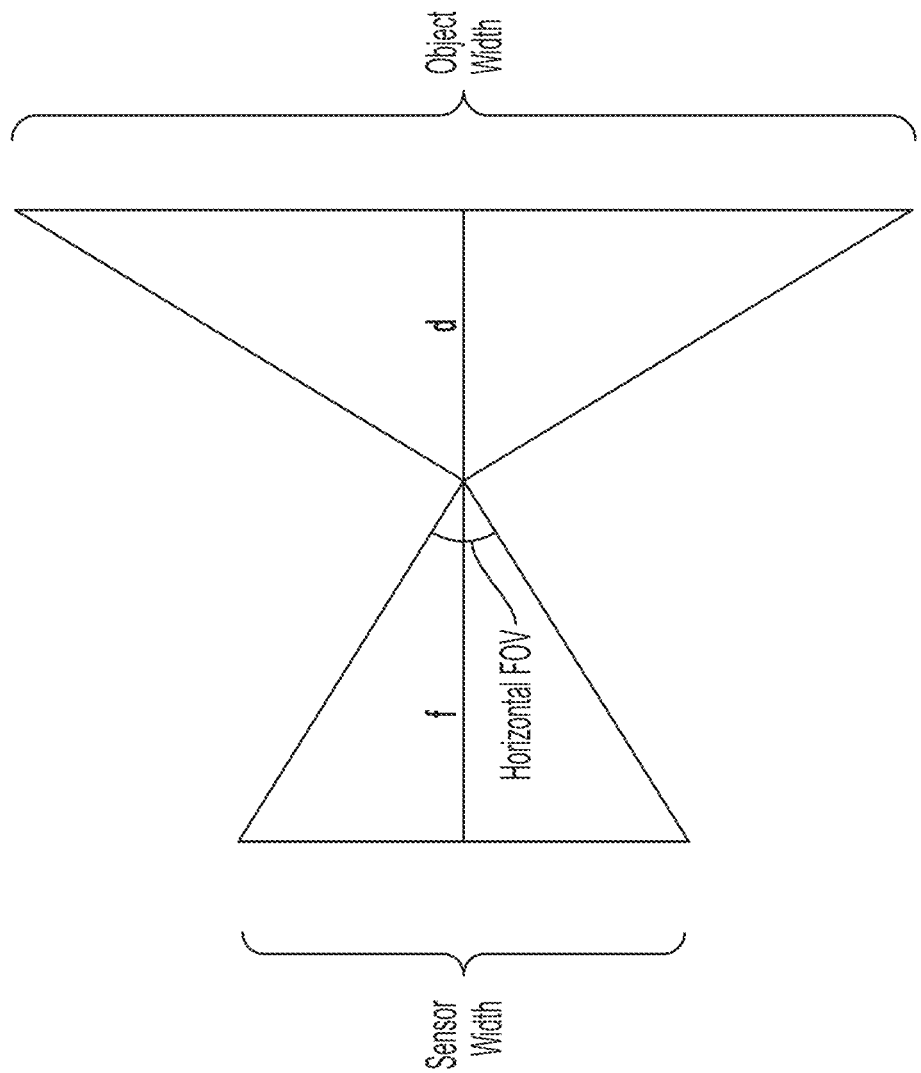
FIG. 5 is a diagram illustrating a field of view of a camera relative to an object, according to some embodiments of the technology described herein.

In some embodiments, the system may be configured to determine the distance using: (1) one or more properties of a camera (e.g., of a mobile device) being used to capture the images; and (2) one or more dimensions of the physical object. For example, the system may determine the distance using a field of view (FOV) of the camera and a height for the physical object. FIG. 5 is a diagram illustrating a field of view of a camera relative to an object, according to some embodiments of the technology described herein. As shown in FIG. 5, the camera sensor has a focal length (f) between the sensor and the lens that determines the horizontal field of view (FOV) of the camera. The system may be configured to determine the distance (d) such that the FOV is sufficient to capture the entire object width as shown in FIG. 5.

Equation 1 below is an example of an equation that the system may use to determine the distance from the physical object:

$$\text{distance} = \frac{\text{Height}}{2 * \tan\left(\frac{FOV}{2}\right)} \quad \text{Equation (1)}$$

In equation 1 above, Height is a value of a height for the physical object in an image (e.g., the height of a boundary generated at block 302), FOV is a value of a field of view of the camera (e.g., in degrees). In some embodiments, the system may be configured to determine the value of Height in equation 1 according to a dimensions of a determined boundary (e.g., a box) enclosing the physical object. For example, the system may determine the value of Height based on a diagonal of a portion of the camera's field of view including the boundary. In some embodiments, the system may be configured to adjust the value of Height. For example, the system may adjust the value of Height based on a desired proportion of a captured image that is to be taken up by the physical object. In some embodiments, the system may be configured to adjust the Height by dividing its value by the desired proportion (e.g., percentage) of the image. In some embodiments, the system may be configured to modify the value of Height to account for error in the boundary obtained at block 302 (e.g., the user setting an incorrect height of a box). For example, the system may decrease the value by a percentage to ensure that the entire physical object would be contained in an image captured at the determined distance.

In some embodiments, the system may be configured to determine the FOV of the camera by reading one or more camera property values. In some embodiments, where the system may be configured to read the camera property value(s) from an AR system of the mobile device. For example, the system may read horizontal and vertical FOV values provided by ARKIT's camera and viewport properties. The system may be configured to use the camera property value(s) to determine the FOV. For example, the system may use the horizontal and vertical FOV values to determine a diagonal FOV value to use in equation 1.

The inventors have recognized that different dimensions of a physical object are in a field of view of a camera at different positions relative to the physical object. Accordingly, in some embodiments, the system may be configured to determine the distance for a position such that a desired portion of the field of view is occupied by the physical object. The system may be configured to determine the value of Height in equation 1 based on the visible dimensions at a position. For example, at a position of 0 degrees measured from the front of the physical object, the value of Height may be set based on (e.g., as a percentage of) a diagonal determined by a width and height of a box enclosing the physical object. In another example, at 90 degrees, the value of Height may be set based on (e.g., a percentage of) a diagonal determined by a depth and height of a box enclosing the physical object.

After determining the plurality of positions at block 304, process 300 proceeds to block 306, where the system guides the user to capture a plurality images using the AR interface. For example, the system may guide the user to a plurality of positions from which images are to be captured in order to generate a 3D model of the physical object. The system begins at block 310, where the system guides the user to one of the plurality of positions using the AR interface. In some embodiments, the system may be configured to guide the user to a position using the AR interface by generating a graphical user interface (GUI) element in the AR interface. The system may be configured to superimpose the GUI element on a physical scene displayed in the AR interface. By moving to the GUI element in the AR interface, the user may be guided to the position.

FIG. 4B is an illustration of an example AR interface including a GUI element marking a location at which a user is to stand to capture an image of the physical object, according to some embodiments of the technology described herein. The system performing process 300 may be configured to use the AR interface shown in FIG. 4B to guide the user to a position. As shown in FIG. 4B, the AR interface include a GUI element 404 marking a location in the AR interface marking the user position. The GUI element 404 includes two shoe silhouettes marking where a user is to stand, and the text "STAND HERE". The AR interface also displays an instructive message 406 indicating to the user to stand at the GUI element displayed in the AR interface. As shown in this example, the system may instruct the user to go the GUI element in the AR interface in order to guide the user to the position.

In some embodiments, the system may be configured to determine a location in the AR interface at which to place the GUI element using the boundary information indicative of the boundary enclosing the physical object (obtained at block 302). The system may be configured to identify the location at which to place the GUI element based on a determined position. For example, the system may determine a location in the AR interface corresponding to a determined distance and angle of a position from which the user is to capture an image. Thus, by standing at the location marked in the AR interface, the user may be at the user position to capture the image.

After guiding the user to one of the plurality of positions using the AR interface at block 310, process 300 proceeds to block 312, where the system determines whether the user can capture an image by performing at least one quality control test. The system may be configured to perform the at least one quality control test to determine whether an image that would be captured meets certain requirements. For example, the system may perform the at least one quality control test to determine whether the image that is to be captured includes a proper view of the physical object, whether the image meets an image quality requirement, and/or other suitable quality control tests. Example steps for determining whether the user can capture an image by performing at least one quality control test are described below in reference to FIG. 3B.

In some embodiments, the system may be configured to determine whether the user is unable to capture an image at a position. In some embodiments, the system may be configured to determine that the user is unable to capture the image at the position by determining that the at least one quality control test cannot be completed. For example, the system may determine that the user is unable to capture the image at the position when the at least one quality control test is not complete after a threshold amount of time. In another example, the system may determine that an image captured from the position would not meet one or more requirements (e.g., based on a field of view of the camera). In some embodiments, the system may be configured to determine to capture another image (e.g., as described at block 318) when the system determines that the user is unable to capture the image at a position. For example, the system may skip the position and instruct the user to proceed to another position to capture another image. In some embodiments, the system may be configured to allow the user to capture an image even if the at least one quality control test cannot be completed. For example, the system may allow the user to capture the image if the at least one quality control test cannot be completed after a period of time. In another example, the system may allow the user to capture an image with a message indicating that the image does not meet requirement(s).

Next, process 300 proceeds to block 314, where system, in response to determining that the user can capture the image, enables the user to capture the image via the AR interface. In some embodiments, the system may be configured to enable the user to capture the image by enabling the user to input a command to capture the image. In some embodiments, the system may be configured to display a GUI element in response to determining that the user can capture the image. The system may be configured to cause the camera to capture an image in response to selection of the GUI element (e.g., by tapping). In some embodiments, the system may be configured to automatically capture an image in response to determining that the user can capture the image. For example, when the system determines that the user can capture the image, the system may transmit instructions to the camera to cause the camera to capture the image.

Next, process 300 proceeds to block 316, where the system performs one or more post capture quality control tests. In some embodiments, the system may be configured to perform the post capture quality control test(s) to determine whether the captured image meets one or more thresholds of image quality. In some embodiments, the system may be configured to determine whether the image exceeds a threshold level of blurriness. The system may be configured to: (1) determine a value indicating blurriness of the image; and (2) determine whether the value meets the threshold level of blurriness. For example, the system may determine a variance of a Laplacian of the image as the value indicating blurriness of the image. The system may obtain the variance of the Laplacian by: (1) convolving the image with a Laplacian kernel; and (2) determining a variance of the result of the convolution. In some embodiments, the system may be configured to use a Laplacian operator provided by the OPENCV library. In another example, the system may determine a Fast Fourier Transform of the image to identify frequencies in the image. The system may determine whether the image is too blurry based on the identified frequencies. In some embodiments, the system may be configured to determine whether there is sufficient lighting in the captured image. The system may be configured to determine whether there is sufficient light in the captured image by determining whether a value indicating light intensity meets a threshold value. For example, the system may determine whether an ambient light intensity is greater than a threshold ambient light intensity.

In some embodiments, the system may be configured to perform post capture quality control test(s) on a background of a captured image. For example, the system may perform a post capture quality control test to determine whether the background of the image is too cluttered by determining whether the background has too many different items. In some embodiments, the system may detect objects in the background, and determine whether the background contains more than a threshold number of objects (e.g., more than 2, 3, 4, 5, 6, 7, 8, 9, 10, 11, 12, 13, 14, 15, 16, 17, 18, 19, 20, 25, 30 or 50 objects). When the background contains more than the threshold number of objects, the system may determine that the background of the image is too cluttered and may generate a notification that the captured image did not pass the post-capture quality control test.

Figure 6A:
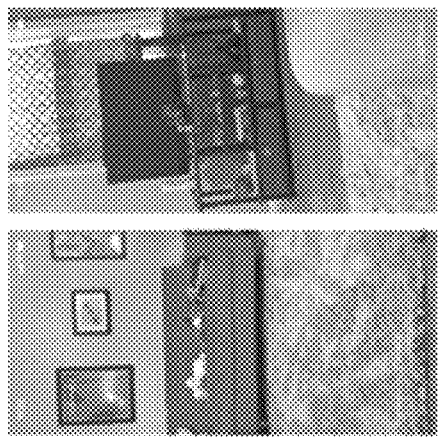
FIG. 6A is an illustration of a first set of images that fail to meet a criterion of blurriness and a second set of images that meet the criterion of blurriness, according to some embodiments of the technology described herein.
Figure 6A:
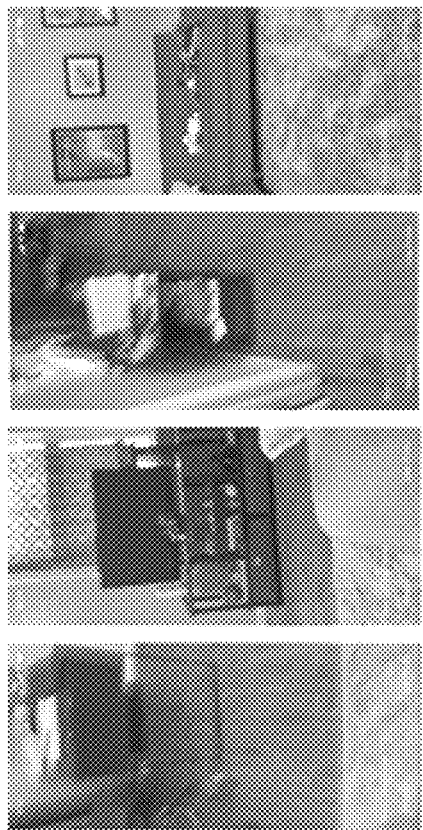

FIG. 6A is an illustration of a first set of images (shown on the left) that fail to meet a criterion of blurriness and a second set of images (on the right) that meet the criterion of blurriness, according to some embodiments of the technology described herein. In the example of FIG. 6A, the system uses a threshold variance of Laplacian of 800 to determine whether an image does not meet a threshold blurriness. The first set of images that are determined to be too blurry because each of the images has a variance of Laplacian value less than 800. The second set of images each meets the threshold of blurriness because each of the images has a variance of Laplacian value that is greater than 800. Although in the example of FIG. 6A, the system is configured to use a threshold variance of Laplacian of 800, in some embodiments, the system may be configured to use a threshold variance of Laplacian value of 50, 100, 150, 200, 250, 300, 350, 400, 450, 500, 550, 600, 650, 700, 750, 850, 900, 950, 1000, 1500, or another suitable value.

Next, process 300 proceeds to block 318, where the system determines whether to capture another image. In some embodiments, the system may be configured to determine whether the user has captured an image from each of the plurality of positioned determined at block 304. For example, the system may track a number of images captured and determine whether the number of captured images meets a target number of images. If the system determines that another image is to be captured, then process 300 proceeds to block 310, where the user is guided to another one of the plurality of positions using the AR interface (e.g., by instructing the user to move to another GUI element placed in the AR interface).

If, at block 318, the system determines that there are no more images to be captured (e.g., because an image has been captured from each of the plurality of positions), then process 300 proceeds to block 308, where the system outputs the plurality of images. In some embodiments, the system may be configured to output the images to another system. For example, the system may output the images to a website (e.g., to display on a product information page). In another example, the system may output the images to another software application (e.g., to generate a 3D model of the physical object). In some embodiments, the system may be configured to output the images by storing the images in memory. For example, the system may store the images on the device. In another example, the system may transmit the images over a communication network (e.g., the Internet) for storage on a device(s) (e.g., a database). In some embodiments, the system may be configured to output the images to another system for additional processing. For example, the system may output the images to another system for compilation, background modification (e.g., removal), emulation of studio photography, generation of a 3D model of the physical object, and/or other processing. In some embodiments, the system may be configured to output the images to another computer (e.g., a server) for color correction of the images. In some embodiments, the system may be configured to output the images to another software module for color correction of the images.

Figure 3B:
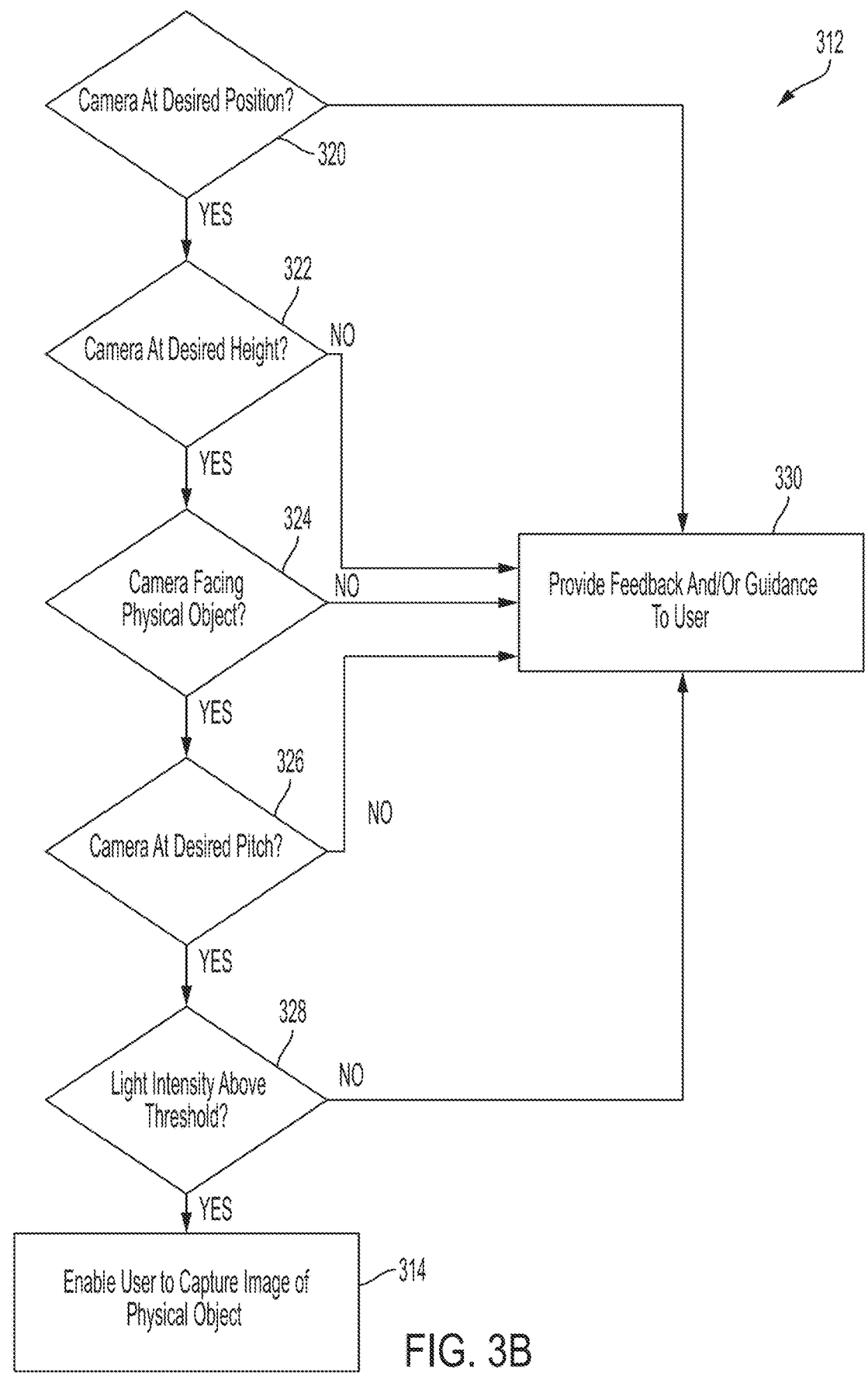
FIG. 3B is a diagram of an illustrative process 312 for determining whether to enable a user to capture an image, according to some embodiments of the technology described herein.

FIG. 3B is a diagram of an illustrative process 312 for determining whether to enable a user to capture an image, according to some embodiments of the technology described herein. Process 312 may be performed as part of process 300, as described above in reference to FIG. 3A.

Process 312 begins at block 320, where the system determines whether a camera is at a desired camera position. In some embodiments, the system may be configured to determine whether the camera is at the desired camera position by determining whether the camera is within a threshold boundary of a location in the AR interface. In some embodiments, the system may be configured to determine whether the camera is in a boundary of a location of a GUI element generated in the AR interface indicating a user position (e.g., the GUI element described herein with reference to FIG. 4B). The boundary may be defined by points in a coordinate space. The system may determine whether coordinates indicating the location of the camera are within the boundary. For example, the system may determine whether x-axis and z-axis coordinates of the camera are within the boundary.

If, at block 320, the system determines that the camera is not at the desired camera position, then process 300 proceeds to block 330, where the system provides feedback and/or guidance to the user to adjust the position of the camera. In some embodiments, the system may be configured to generate a visual prompt to guide the user to the displayed GUI element. For example, the visual prompt may be a message in the AR interface instructing the user to move to a displayed GUI element. In another example, the system may cause a GUI element in the AR interface to flash and/or change colors. In some embodiments, the system may be configured to output audio instructions to the user.

If, at block 320, the system determines that the camera is at the desired camera position, then process 312 proceeds to block 322, where the system determines whether the camera is at the desired height. In some embodiments, the system may be configured to determine whether the camera is at the desired height by: (1) determining a value indicating a current height of the camera; and (2) determining whether the value meets the desired height. In some embodiments, the system may be configured to determine whether the camera height meets a target height by determining whether the camera is within a threshold boundary of a location in the AR interface. FIG. 4C is an illustration of an AR interface showing an indication of a height of a camera position for capturing the image of the physical object, according to some embodiments of the technology described herein. As shown in FIG. 4C, the AR interface displays a floating camera 412 marking a desired height of the camera in the AR interface. The system may be configured to determine whether the camera is at the desired height by determining whether the camera is within a threshold boundary of the floating camera 412. As shown in FIG. 4C, the system displays a message 410 instructing the user to match the height of the camera to that of the floating camera shown in the AR interface.

If, at block 322, the system determines that the camera is not at the desired height, then process 300 proceeds to block 330, where the system provides feedback and/or guidance to the user to adjust the height of the camera. In some embodiments, the system may be configured to generate a visual prompt in the AR interface guiding the user to move the camera to a desired height. For example, the system may generate a message in the AR interface instructing the user to move a camera to a displayed GUI element (e.g., message 410 shown in FIG. 4C). In another example, the system may cause a GUI element (e.g., a floating camera 412 as shown in FIG. 4C) at a location in the AR interface to flash and/or change colors. In some embodiments, the system may be configured to output audio instructions to the user.

If, at block 322, the system determines that the camera is at the desired height, then process 300 proceeds to block 324, where the system determine whether the camera is facing the physical object. In some embodiments, the system may be configured to determine whether the camera is facing the physical object by determining whether the physical object is in a frustum view of the camera. The system may be configured to determine a frustum view of the camera and whether a boundary (e.g., AR boundary box) enclosing the physical object in the AR interface is within the frustrum view. In some embodiments, the system may be configured to determine whether a threshold portion of the boundary is in the view. For example, the system may determine whether a threshold percentage (e.g., 50%, 60%, 70%, 80%, 90%, or 100%) of the boundary is in the view.

If, at block 324, the system determines that the camera is not facing the physical object, then process 300 proceeds to block 330, where the system provides feedback and/or guidance to the user to adjust the position of the camera. In some embodiments, the system may be configured to generate a visual prompt in the AR interface to guide the user. For example, the system may generate a message in the AR interface instructing the user adjust the camera such that a greater portion of the boundary enclosing the physical object is in the displayed AR interface. In another example, the system may generate an arrow indicating a direction in which to move the camera. In some embodiments, the system may be configured to output audio instructions to the user.

If, at block 324, the system determines that the camera is facing the physical object, then process 312 proceeds to block 326, where the system determines whether the camera is at a desired pitch. In some embodiments, the system may be configured to determine whether the camera is at the desired pitch by determining whether the camera meets a threshold pitch angle. The system may be configured to determine a pitch angle using a measurement of one or more sensors (e.g., gyroscope) of a device. For example, the system may: (1) determine a measured attitude quaternion; and (2) determine a pitch angle using the attitude quaternion. The system may be configured to compare the pitch angle to a target pitch angle.

Figure 4D:
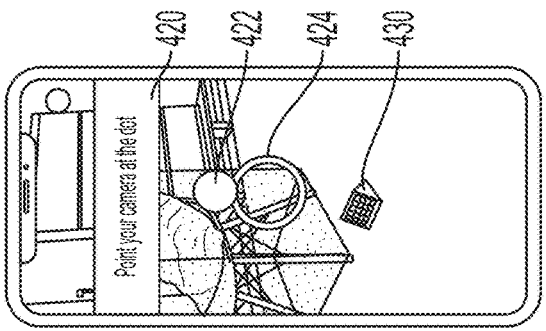
FIG. 4D is an illustration of an AR interface showing a GUI element 422 indicating a current pitch of the camera, according to some embodiments of the technology described herein.

In some embodiments, the system may be configured to generate a GUI element in the AR interface indicating a current pitch of the camera. FIG. 4D is an illustration of an AR interface showing a GUI element 424 indicating a current pitch of the camera, according to some embodiments of the technology described herein. As shown in FIG. 4D, the GUI element 424 is a circle indicating a pitch of the camera. The AR interface further displays another GUI element 422 representing a target pitch of the camera. The GUI element 424 in the example of FIG. 4D is a white dot. When the GUI element 424 is aligned with the GUI element 422, the camera may be at the desired pitch. The AR interface displays a message 420 instructing the user to point the camera at the white dot 422 (e.g., by adjusting the pitch of the camera such that the white dot 422 is in the circle 424).

If, at block 326, the system determines that the camera is not at the desired pitch, then process 300 proceeds to block 330, where the system provides feedback and/or guidance to the user to adjust the position of the camera. In some embodiments, the system may be configured to generate a visual prompt in the AR interface to guide the user. For example, the system may generate message in the AR interface instructing the user to adjust the pitch of the camera (e.g., message 420 shown in FIG. 4D). In another example, the system may generate an arrow indicating a direction in which to rotate the camera. In some embodiments, the system may be configured to output audio instructions to the user.

If, at block 326, the system determines that the camera is at the desired pitch, then process 312 proceeds to block 328, where the system determines whether the light intensity is above a threshold. In some embodiments, the system may be configured to determine a value indicative of the light intensity. For example, the system may access a measurement taken by an ambient light sensor (e.g., of a mobile device). In some embodiments, the system may be configured to access the measurement taken by the ambient light sensor from an AR system of a mobile device. For example, the system may access an ambient light intensity value provided by APPLE's ARKIT system.

Figure 6B:
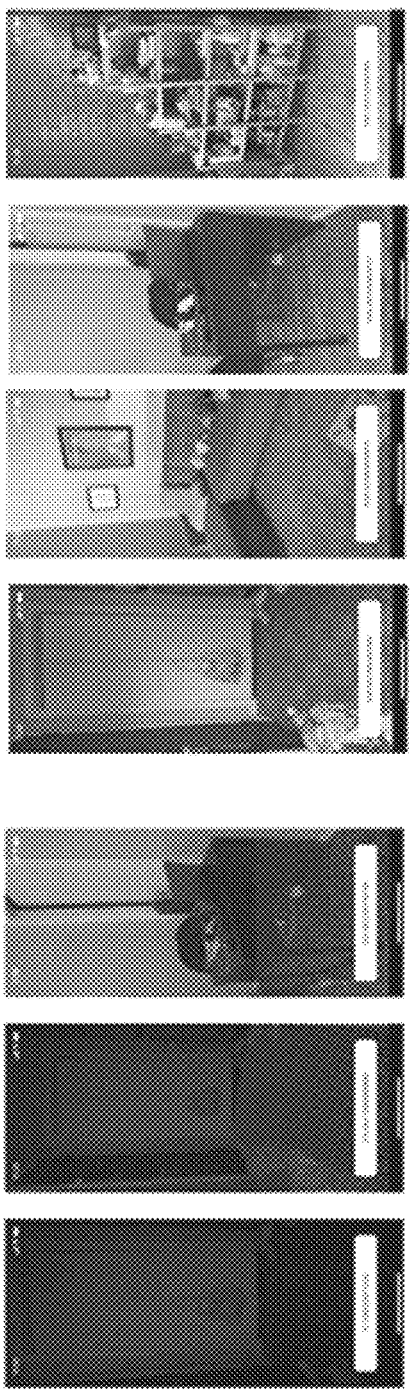
FIG. 6B is an illustration of a first set of screenshots of an AR interface when ambient light intensity does not meet a threshold value and a second set of screenshots of the AR interface when ambient light intensity meets a threshold value, according to some embodiments of the technology described herein.

FIG. 6B is an illustration of a first set of screenshots of an AR interface when ambient light intensity does not meet a threshold value and a second set of screenshots of the AR interface when ambient light intensity meets a threshold value, according to some embodiments of the technology described herein. As indicated in FIG. 6B, the first set of screenshots (on the left) have an ambient light intensity of less than 800 lux (lx). The second set of screenshots (on the right) have an ambient light intensity that is greater than or equal to 800 lx. In the example of FIG. 6B, the system may not enable the user to capture an image of a physical object when the ambient light intensity is less than 800 lx. Although in the example of FIG. 6B, the system is configured to use a threshold ambient light intensity of 800 lx, in some embodiments, the system may be configured to use a threshold light intensity of 50 lx, 100 lx, 200 lx, 300 lx, 400 lx, 500 lx, 600 lx, 700 lx, 900 lx, 1000 lx, 1500 lx, 2000 lx, or any other suitable threshold light intensity.

If, at block 328, the system determines that the light intensity is not above a threshold, then process 300 proceeds to block 330, where the system provides feedback and/or guidance to the user to adjust the light intensity. In some embodiments, the system may be configured to generate a visual prompt in the AR interface to guide the user. For example, the system may generate a message in the AR interface indicating that more light needs to be provided in the physical scene. In some embodiments, the system may be configured to output audio instructions to the user. In some embodiments, the system may be configured to provide the user with an option to turn on a light of the camera (e.g., flash) to increase the light intensity. For example, the system may generate a GUI element in the AR interface that, when selected by the user, turns on flash of the camera.

If, at block 328, the system determines that the light intensity is above the threshold, then process 300 proceeds to block 314, where the system enables the user to capture an image of the physical object. In some embodiments, the system may be configured to enable to the user to capture the image of the physical object by enabling use of the camera. The system may be configured to enable the user to provide input through the AR interface that causes the camera to capture an image. For example, the system may generate a GUI element (e.g., a capture button) that, when selected, causes the camera to capture an image.

FIG. 4E is an illustration of an AR interface enables the user to capture an image after performing at least one quality control test (e.g., as described at blocks 320-328), according to some embodiments of the technology described herein. In the example of FIG. 4E, the camera is at the desired camera position, the camera is at a desired height, the camera is facing the physical object (e.g., the boundary 426 enclosing the physical object), the white dot 422 is aligned with the target circle 424 indicating that the camera is at the desired pitch, and the light intensity is above a threshold light intensity. Accordingly, the AR interface displays a GUI element 428 labeled "CAPTURE" that, when selected by the user, may cause the camera to capture an image.

FIG. 4F is an illustration of an image captured using the AR interface shown in FIG. 4E, according to some embodiments of the technology described herein. the image shown in FIG. 4E may be one of a plurality of images output by a system (e.g., a system performing process 300). The image may meet one or more requirements for the image (e.g., for use in generating a 3D model of the physical object).

Although in the example of FIG. 3B the system performs each of the quality control tests at blocks 320-328, in some embodiments, the system may be configured to perform one or more of the tests, but not all, of the tests. For example, the system may determine whether the camera is at a desired position as described at block 320 and at the desired height as described at block 322, but not perform the other tests of blocks 324, 326, 328. In some embodiments, the system may be configured to perform one or more quality control tests in addition to, or instead of those of FIG. 3B. It should also be appreciated that quality control tests may be performed in sequences different from that of FIG. 3B.

Figure 7A:
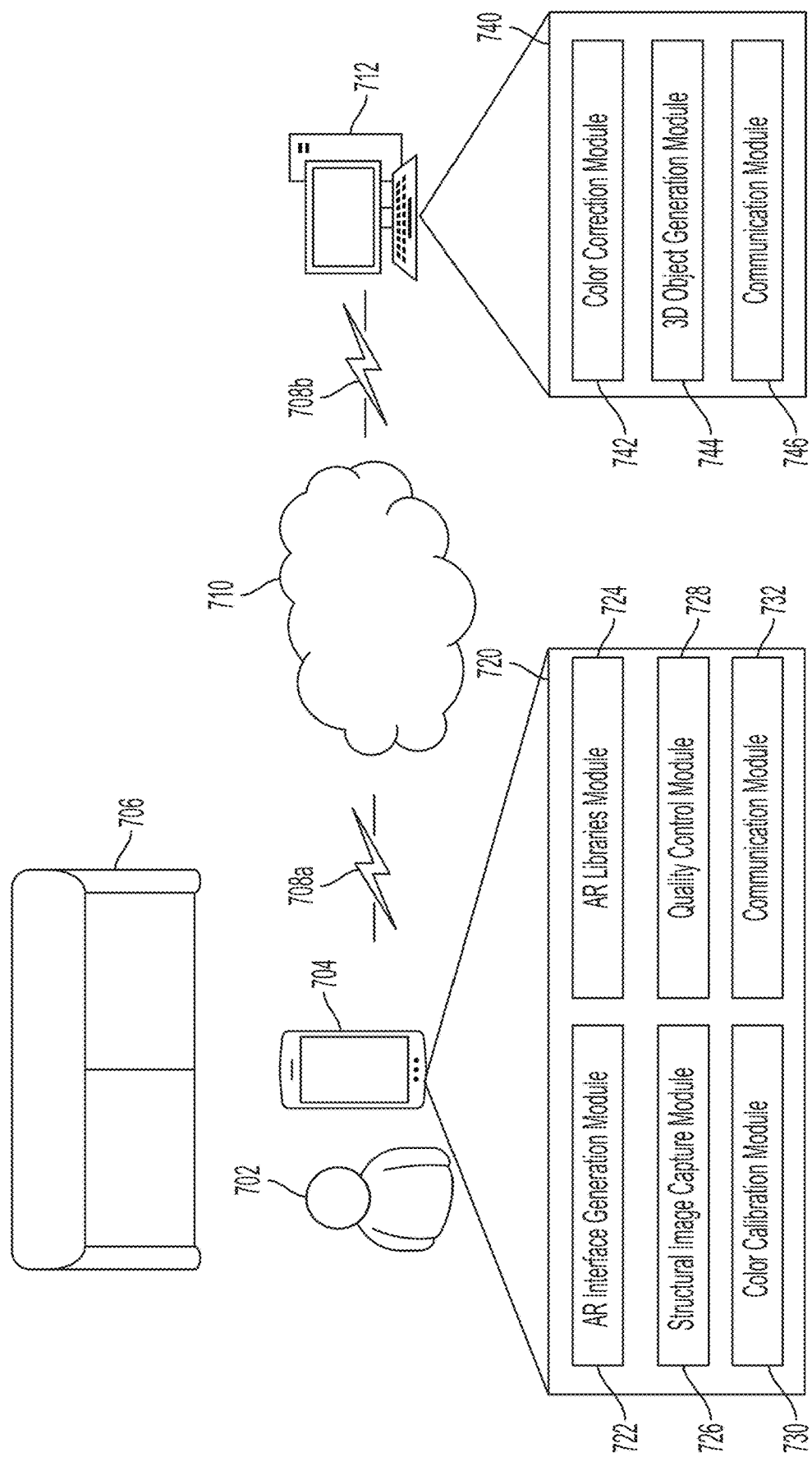
FIG. 7A is a diagram illustrating an example environment in which some embodiments of the technology described herein may be implemented.

FIG. 7A is a diagram illustrating an example environment in which some embodiments of the technology described herein may be implemented, according to some embodiments of the technology described herein. The environment of FIG. 7 includes a user 702 using a mobile device 704 to capture images of a physical object 706 (e.g., an article of furniture). The mobile device is in communication over a communication network 710 (e.g., the Internet) with a computer 712.

As shown in the example embodiment of FIG. 7A, the mobile device 704 is a smartphone. For example, the mobile device 204 may be an APPLE IPHONE XS, SAMSUNG GALAXY S10, GOOGLE PIXEL, or other type of mobile device. In some embodiments, the mobile device 704 may have a touch screen. The touch screen may be used by the user 702 to interact with the mobile device 704 and software applications of the mobile device 704. Although in the example of FIG. 7A, the mobile device 704 is a smartphone, in some embodiments a different type of mobile device may be used. For example, the mobile device 704 may be a laptop, tablet, digital camera, a smartwatch, a virtual reality headset, smart glasses, or any other suitable type of mobile device.

As shown in FIG. 7A, the mobile device 704 includes multiple different software modules 720. In some embodiments, the software modules 720 may be implemented in one or more software applications that are installed on the mobile device 704. For example, the software modules 720 may be part of a software application downloaded onto the mobile device 704 from an online repository of software applications (e.g., APPLE's APP STORE).

As shown in the example embodiment of FIG. 7A, the software modules 720 include an augmented reality (AR) interface generation module 722. In some embodiments, the AR interface generation module 722 may be configured to generate an interactive AR environment that is displayed on a display (e.g., touchscreen) of the mobile device 704. The AR generation interface module 722 may be configured to generate an AR interface through which the user 702 can interact in the AR environment.

In some embodiments, the AR interface generation module 722 may be configured to superimpose GUI elements in the AR interface. For example, the AR interface generation module 722 may generate a virtual boundary (e.g., a box) enclosing a physical object in a field of view of a camera of the mobile device 704. In some embodiments, the AR interface module 722 may be configured to generate GUI elements in response to user input. For example, the AR interface generation module 722 may receive user input indicating points of a box (e.g., by tapping three points on a touchscreen), and generate a box based on the user input. The AR interface generation module 722 may further allow the user to adjust dimensions of the box. For example, the AR interface generation module 722 may provide a GUI element that allows a user to adjust the height of the box.

In the example embodiment of FIG. 7A, the software modules 720 include an AR libraries module 724. In some embodiments, the AR libraries module 724 may include resources that can be used by software applications of the mobile device 704 to implement an AR interface. The AR libraries module 724 may include one or more classes, methods, values, application program interfaces (APIs), and/or modules that may be used to generate and manage an AR interface. For example, the mobile device 704 may have an ANDROID operating system. In this example, the AR libraries module 724 may include GOOGLE's ARCORE library. In another example, the mobile device 704 may have an APPLE IOS operating system. In this example, the AR libraries module 724 may include APPLE's ARKIT.

In some embodiments, the AR libraries module 704 may be configured to provide information from a camera of the mobile device 704. For example, the AR libraries module 704 may include a module that allows a software application to access a live image feed from the camera. The live image feed may be used to display a physical scene captured by the camera on a display of the mobile device 704. In some embodiments, the AR libraries module 704 may be configured to provide information about a camera of the mobile device 704. For example, the AR libraries module 724 may include properties of the camera such as field of view (e.g., vertical, and horizontal field of view), focal length, and/or a width of the camera's image sensor.

In some embodiments, the AR libraries module 724 may be configured to provide measurements obtained by one or more sensors of the mobile device 704. In some embodiments, the AR libraries module 724 may be configured to provide a measured height of the mobile device 704 (e.g., obtained by a global positioning system (GPS) of the mobile device 704). In some embodiments, the AR libraries module 724 may be configured to provide an indication of a rotational position of the camera. For example, the AR libraries module 724 may provide an attitude quaternion of the mobile device 704 which may be used to determine a rotational position of the camera. In some embodiments, the AR libraries module 724 may be configured to provide information about lighting detected in a physical scene. For example, the AR libraries module 724 may provide an ambient light intensity measured by a light sensor of the mobile device 704.

In the example embodiment of FIG. 7A, the software modules 720 include a structural image capture module 726. The structural image capture module 726 may be configured to guide the user 702 to capture images of the physical object 706. For example, the structural image capture module 726 may guide the user 702 to multiple position around the physical object 706 to capture images of the physical object 706. The structural image capture module 726 may be configured to use the AR interface generation module 722 to guide the user 702 through an AR interface on the mobile device 704. For example, the structure image capture module 726 may generate one or more GUI elements guiding the user to the different positions and in positioning of a camera to capture the multiple images.

In some embodiments, the structural image capture module 726 may be configured to obtain boundary information indicative of a boundary enclosing the physical object 706. In some embodiments, the structure image capture module 726 may be configured to generate the boundary information based on input from the user 702. For example, the user 702 may indicate (e.g., by tapping on a touchscreen of the mobile device 704) points defining a surface of a box. The structural image capture module 726 may use the points to generate a box (e.g., as illustrated in FIG. 2A) to enclose the physical object 706 displayed in an AR interface. The structural image capture module 726 may further allow the user to modify dimensions of the box to enclose the entire physical object 706 (e.g., by allowing the user to modify a height of the box as illustrated in FIG. 4A).

In some embodiments, the structural image capture module 726 may be configured to determine the boundary enclosing the physical object using computer vision techniques. For example, the structural image capture module 726 may apply an image segmentation algorithm to an image feed of a camera of the mobile device 704 to identify a boundary of the physical object 706 in a field of view of the camera. The structural image capture module 726 may generate a boundary (e.g., a box) around the identified physical object 706 in an AR interface.

In some embodiments, the structural image capture module 726 may be configured to determine one or more positions from which a user is to capture an image of the physical object 706. For example, the structural image capture module 726 may identify distances from and/or angles around the physical object 706 from where the user 702 is to capture images. In some embodiments, the structural image capture module 726 may be configured to determine the position(s) based on a set of requirements. For example, the structural image capture module 726 may determine the position(s) to capture images that can be used to generate a 3D model of the physical object 706. In another example, the structural image capture module 726 may determine the position(s) to capture images that show certain (e.g., all) features of the physical object 706.

In some embodiments, the structural image capture module 726 may be configured to guide the user 702 to the determined position(s). The structural image capture module 726 may be configured to use an AR interface to guide the user 702 to the position(s). For example, the structural image capture module 726 may generate GUI elements in an AR interface indicating the position(s) from which the user is to capture image(s). The structural image capture module 726 may be configured to generate GUI elements in an AR interface to guide positioning of a camera of the mobile device 704 for capturing the images.

In the example embodiment of FIG. 7A, the software modules 720 include a quality control module 728. The quality control module 728 may be configured to perform one or more quality control tests for capturing image(s) of the physical object 706. In some embodiments, the quality control module 728 may be configured to perform one or more quality control tests prior to an image being captured. For example, the quality control module 728 may determine whether a camera of the mobile device 704 is at a desired position, height, whether it is facing the physical object 706, whether it is at a desired pitch, whether a light intensity is above a threshold, and/or other quality control test(s). In some embodiments, the quality control module 728 may be configured to enable capture of an image after determining that the camera has passed the quality control test(s). For example, the quality control module 728 may be configured to perform process 312 described herein with reference to FIG. 3B.

In some embodiments, the quality control module 728 may be configured to enable and/or disable image capture functionality (e.g., in an AR interface). The quality control module 728 may be configured to: (1) enable image capture when the quality control module 728 has determined that a camera of the mobile device 704 passes one or more quality control tests; and (2) disable image capture when the camera has not passed the quality control test(s). For example, the quality control module 728 may display a GUI element that the user 702 can select to capture an image when the quality control module 728 has enabled image capture. In some embodiments, the quality control module 728 may be configured to provide feedback and/or guidance to a user when the camera does not pass the quality control test(s). For example, the quality control module 728 may provide a message with instructions for the user 702 to make an adjustment. Examples of feedback and guidance that may be provided by the quality control module 728 are described herein with reference to FIG. 3B.

In some embodiments, the quality control module 728 may be configured to perform one or more quality control tests after an image has been captured to determine whether the captured image meets a desired level of quality. In some embodiments, the quality control module 728 may be configured to determine whether the captured image meets a threshold level of sharpness. For example, the quality control module 728 may determine a value indicating blurriness of a captured image and determine whether the value indicating blurriness of the captured image is below a threshold value. In some embodiments, the quality control module 728 may be configured to determine whether a captured image has sufficient brightness, contrast, resolution, and/or other measure(s) of image quality.

In the example embodiment of FIG. 7A, the software modules 720 include a color calibration module 730. The color calibration module 730 may be configured to guide a user to capture a color calibration image. The color calibration image may be used to correct color in one or more images captured using a camera of the mobile device 704. For example, the color calibration image may be used to determine color correction information (e.g., pixel value adjustments) to correct color in captured images of the physical object 706. In some embodiments, the color calibration module 730 may be configured to guide a user to capture a color calibration image by guiding the user to capture an image of the physical object 706 and a color calibration card. The color calibration card may also be referred to herein as "color correction card", "color checker card", or "card". A color calibration image may be an image of the physical object 706 and the color calibration card.

FIG. 9 is an illustration of a color calibration card, according to some embodiments of the technology described herein. The color calibration card includes multiple different portions, each having a respective color. Each of the colors is determined by a respective pixel value comprising red, green, blue (RGB) levels, which are shown in FIG. 9. Note, a color calibration card used to capture an image may not include a listing of the RGB pixel values. The RGB pixel values are displayed in FIG. 9 for purposes of description. In some embodiments, the RGB pixel values of a respective portion of the color calibration card may indicate target pixel values for a portion of an image including the respective portion of the calibration card. For example, target RGB pixel values for a portion of an image including the "Red" portion of the color calibration card may be [175, 54, 60] as shown in FIG. 9. In another example, target RGB pixel values for a portion of an image including the "Green" portion of the color calibration card may be [70, 148, 73] as shown in FIG. 9.

In some embodiments, the color calibration module 790 may be configured to obtain a color calibration image data from an image sensor of a camera of the mobile device 704. For example, the color calibration module 790 may obtain the image data from a charge-coupled device (CCD) image sensor of the camera. In another example, the color calibration module 790 may obtain the image data from a complementary metal-oxide-semiconductor (CMOS) image sensor of the camera. In some embodiments, the color calibration module 790 may be configured to obtain unprocessed image data from the image sensor. For example, the color calibration module 790 may obtain the image data in DNG format. In some embodiments, the color calibration module 790 may be configured to obtain preprocessed image data. For example, the color calibration module 790 may obtain the image data in JPEG format.

In the example embodiment of FIG. 7A, the software modules 720 include a communication module 732. The communication module 732 may be configured to communicate through network 710 (e.g., the Internet) with computer 712. For example, the mobile device 704 may be communicatively coupled to the computer 712 over the network 710 The communication module 732 may be configured to transmit image data 708a from the mobile device 704 to the computer 712 (e.g., for 3D object generation and/or color correction). In some embodiments, the communication module 732 may be configured to use wireless communication circuitry (e.g., a network interface device) of the device 704 to communicate over the network 710. For example, the communication module 732 may transmit image data 708a (e.g., comprising images of the physical object 706 and/or a color calibration image) to the computer 712 in multiple data packets.

In some embodiments, the communication module 732 may be configured to receive data 708b transmitted from the computer 712 over network 710. In some embodiments, the communication module 732 may be configured to receive processed versions of images (e.g., of physical object 706) transmitted to the computer 712. For example, the communication module 732 may: (1) transmit, to the computer 712, image data comprising images of the physical object 706 and a color calibration image captured by the mobile device 704; and (2) after transmitting the image data, receive processed (e.g., color corrected) versions of the images of the physical object. In some embodiments, the communication module 732 may be configured to receive a 3D model of the physical object 706 generated (e.g., by computer 712) using images of the physical object 706 captured by the mobile device 704.

In some embodiments, the network 710 may be configured to allow different computing devices including mobile device 704 and computer 712 to communicate via the network 710. For example, the network 710 may be the Internet. In another example, the network 710 may be a local area network (LAN). In another example, the network 710 may be a wide area network (WAN). In another example, the network 710 may be a cellular (e.g., 3G, 4G, and/or 5G) network. In another example, the network 710 may be a BLUETOOTH connection between the mobile device 704 and compute 712.

In some embodiments, the computer 712 may be a server, a desktop computer, a mobile device (e.g., a smartphone, digital camera, tablet, laptop, and/or a wearable device), a workstation, or any other suitable computing device. As shown in FIG. 7A, the computer 712 includes software modules 740 including a color correction module 742, a 3D object generation module 744, and a communication module 746.

In some embodiments, the color correction module 742 may be configured to obtain color correction information from a color calibration image (e.g., captured by mobile device 704). The color correction module 742 may be configured to obtain the color correction information by: (1) detecting a color calibration target (e.g., a color calibration card) in the color calibration image; (2) identifying pixels in the color calibration image associated with a color; and (3) determining pixel values (e.g., RGB values) of the identified pixels. For example, the color correction module 742 may identify pixels associated with a gray color in a color calibration card in an image. In this example, the system may determine RGB values of the identifies pixels.

In some embodiments, the color correction module 742 may be configured to use the color correction information to correct images. For example, the color correction module 742 may use the color correction information to correct color of one or more images of the physical object 706 captured by the mobile device 704. In some embodiments, the color correction module 742 may be configured to adjust pixel values of the images using the color correction information. The color correction module 742 may be configured to determine a color correction that optimizes the pixel values of the identified pixels based on a target pixel value. Continuing with the example above, the color correction module 742 may optimize the RGB values of the pixels associated with a gray color in a color calibration card based on the target pixel value. For example, the color correction module may use Brent's method of optimization as described in Brent, R. P., Ch. 3-4 in *Algorithms for Minimization Without Derivatives*. Englewood Cliffs, N.J.: Prentice-Hall, 1973.

In some embodiments, the 3D object generation module 744 may be configured to generate a 3D model of the physical object 706 using images of the physical object 706 (e.g., captured by a camera of mobile device 704). In some embodiments, the 3D object generation module 744 may be configured piece together the 3D model using the images. The 3D object generation module 744 may be configured to use 3D modelling software to generate the 3D model. For example, the 3D object generation module 744 may use AUTODESK 3D modelling software to generate the 3D model of the physical object 706 using the images.

In some embodiments, the communication module 746 may be configured to communicate through network 710 (e.g., the Internet) with the mobile device 704. For example, the computer 712 may be communicatively coupled to the mobile device 704 over the network 710. The communication module 746 may be configured to receive data 708b from the mobile device 704. In some embodiments, the data 708b may include image data. The image data may comprise images of the physical object 706 (e.g., for use in generating a 3D model of the physical object 706) and/or a color calibration image. In some embodiments, the communication module 746 may be configured to use wireless communication circuitry (e.g., a network interface device) of the computer 712 to communicate over the network 710. For example, the communication module 746 may transmit image data 708b (e.g., comprising color corrected images) to the mobile device 704 in multiple data packets.

Figure 7B:
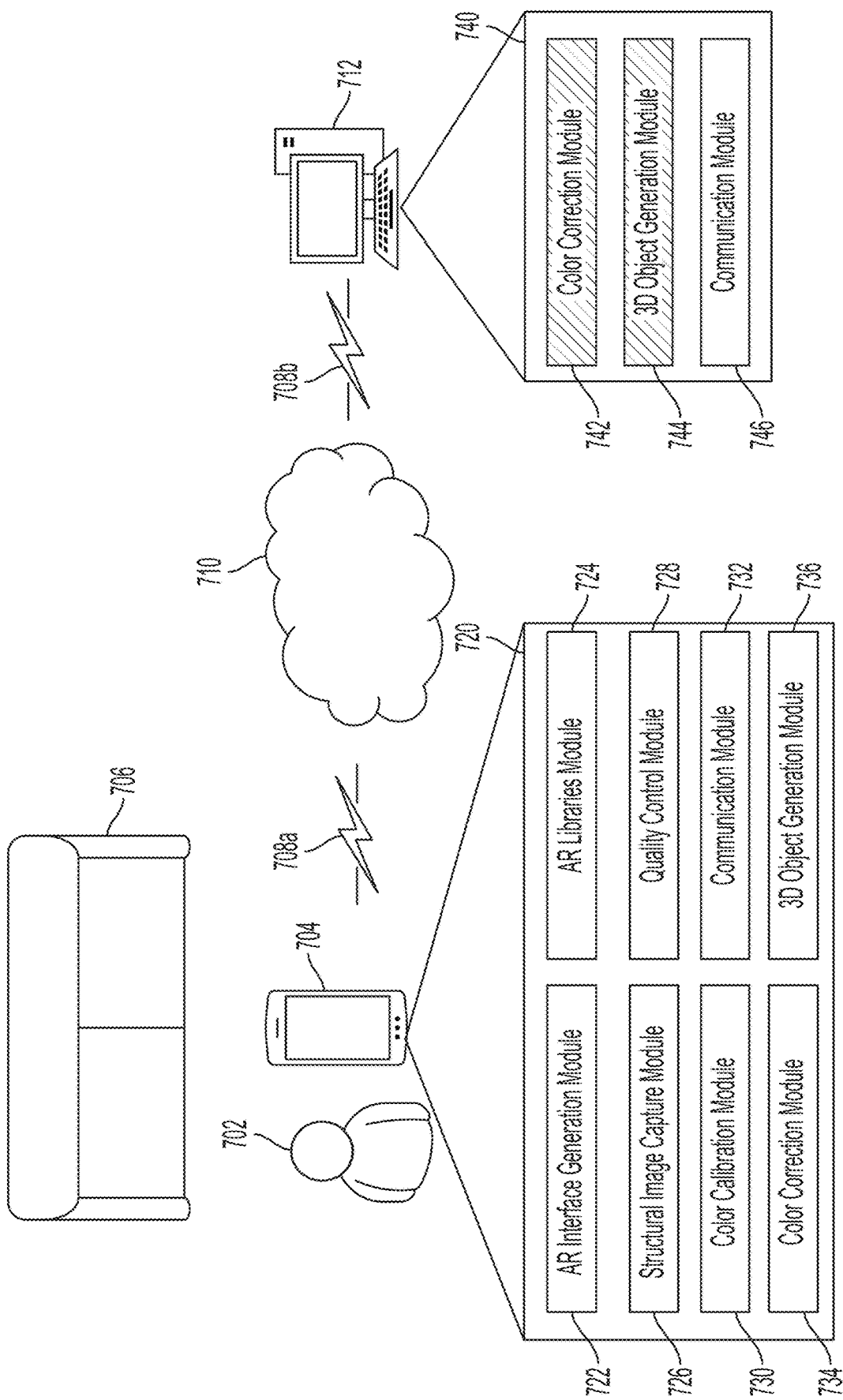
FIG. 7B is a diagram illustrating the environment of FIG. 7A with another embodiment of the mobile device 704 of FIG. 7A, according to some embodiments of the technology described herein.

FIG. 7B is a diagram illustrating the environment of FIG. 7A with another embodiment of the mobile device 704 of FIG. 7A, according to some embodiments of the technology described herein. As shown in FIG. 7B, in some embodiments, the software modules 720 of the mobile device 704 include a color correction module 734. The color correction module 734 may be configured to perform the functions of the color correction module 742 described herein with reference to FIG. 7A. Accordingly, the color correction module 734 may be configured to perform color correction on images captured by a camera of the mobile device 704 in addition to and/or instead of the computer 712. Thus, color correction of images may be performed locally on the mobile device 704 (e.g., without transmitting image data to the computer 712).

As shown in FIG. 7B, in some embodiments, the software modules 720 of the mobile device 704 include a 3D object generation module 736. The 3D object generation module 736 may be configured to perform the functions of the 3D object generation module 744 described herein with reference to FIG. 7A. Accordingly, the 3D object generation module 736 may be configured to generate a 3D model of the physical object 706 using images of the physical object 706 in addition to and/or instead of the computer 712. Thus, 3D model generation may be performed local on the mobile device 704 (e.g., without transmitting image data to the computer 712).

In some embodiments, the software modules 720 may include the color correction module 734 but not the 3D object generation module 736. For example, the mobile device 704 may be configured to transmit images to the computer 712 for generation of a 3D model of the physical object 706. In some embodiments, the software modules 720 may include the 3D object generation module 736 but not the color correction module 734. For example, the mobile device 704 may be configured to transmit images to the computer 712 for color correction. In some embodiments, the software modules 720 may include any combination of one or more of the modules 722, 724, 726, 728, 730, 732, 734, 736 shown in FIG. 7B. In some embodiments, the software modules 720 may include one or more modules in addition to and/or instead of those shown in FIG. 7B.

Figure 8B:
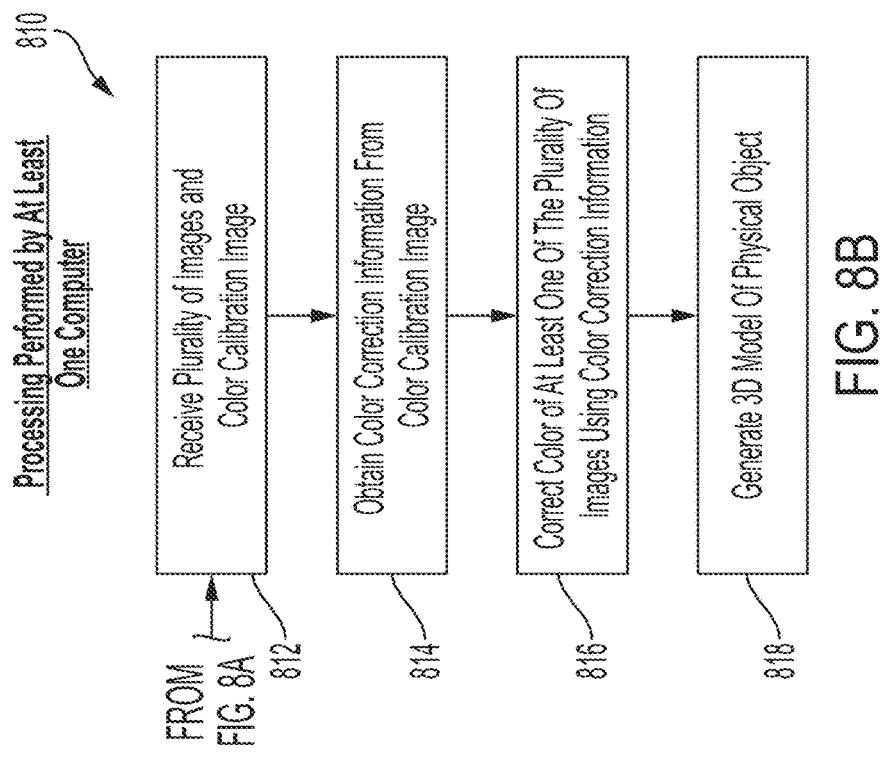
FIG. 8B is a diagram of an illustrative process 810 performed by at least one computer to generate a 3D model of the physical object, according to some embodiments of the technology described herein.
Figure 8A:
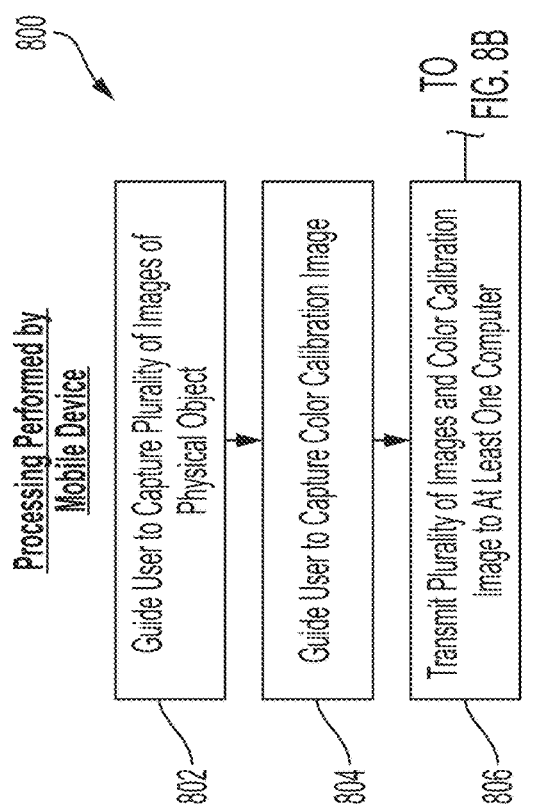
FIG. 8A is a diagram of an illustrative process 800 performed by a mobile device to capture images of a physical object including a color calibration image, according to some embodiments of the technology described herein.

FIG. 8A is a diagram of an illustrative process 800 performed by a mobile device to capture images of a physical object and a color calibration image, according to some embodiments of the technology described herein. Process 800 may be performed by any suitable mobile device. For example, process 800 may be performed by mobile device 704 described herein with reference to FIGS. 7A-B.

Process 800 begins at block 802, where the system guides a user to capture a plurality of images of a physical object (e.g., physical object 706 shown in FIGS. 7A-B). In some embodiments, the system may be configured to guide the user to capture the plurality of images of the physical object as described herein with reference to FIGS. 3A-B.

Next, process 800 proceeds to block 804, where the system guides the user to capture a color calibration image. In some embodiments, the system may be configured to guide the user to capture the color calibration image using an AR interface generated by the system. The system may be configured to guide the user using the AR interface by providing one or more visual prompts in the AR interface. In some embodiments, the visual prompts may include one or more GUI elements guiding the user. In some embodiments, the visual prompts may include one or more messages providing instructions to the user. In some embodiments, the system may be configured to guide the user to: (1) place a color calibration target (e.g., a color calibration card as described herein with reference to FIG. 9) proximate the physical object; and (2) capture one or more images of the physical object and the color calibration target. For example, the system may generate a GUI element indicating a position in the AR interface where the color calibration target is to be placed, and a position in the AR interface from which a color calibration image is to be captured. In some embodiments, the system may be configured to perform one or more quality control tests (e.g., as described in process 312 described herein with reference to FIG. 3B) to enable a user to capture the color calibration image.

Next, process 800 proceeds to block 806, where the system transmits the plurality of images and the color calibration image to at least one computer. FIG. 8B is a diagram of an illustrative process 810 performed by at least one computer to generate a 3D model of the physical object, according to some embodiments of the technology described herein. For example, the at least one computer may be computer 712 described herein with reference to FIGS. 7A-B.

Process 810 begins at block 812, where the system receives the plurality of images and the color calibration image transmitted from the mobile device. In some embodiments, the system may be configured to receive the plurality of images and the color calibration image over a network (e.g., the Internet). The system may be configured to receive image data in network data packets. In some embodiments, the system may be configured to receive the plurality images and the color calibration image by requesting the images (e.g., from the mobile device and/or a datastore).

Next, process 800 proceeds to block 814, where the system obtains color correction information from the color calibration image. In some embodiments, the system may be configured to obtain the color correction information by: (1) detecting a color calibration target (e.g., a color calibration card) in the color calibration image; (2) identifying pixels in the color calibration image associated with a color (e.g., gray) in the color calibration target; and (3) determining pixel values (e.g., RGB values) of the identified pixels.

In some embodiments, the system may be configured to detect a color calibration target in the color calibration image by using template matching and clustering. The system may be configured to localize the color calibration target in the image, and then cluster the pixels in the color calibration target to identify pixels in the color calibration target associated with a color (e.g., gray). In some embodiments, the system may be configured to detect a color calibration target in the color calibration image by performing template matching, and then segmenting the color calibration target based on the template matching. The system may be configured to use a template to: (1) identify pixels corresponding to the color calibration target in the image; and (2) segment the identified pixels from the image. In some embodiments, the system may be configured to identify the color calibration target using a software application associated with the target. For example, the system may use the XRITE software application to automatically detect a color calibration card associated with the XRITE software application.

In some embodiments, the system may be configured to obtain the color correction information using the detected color calibration target. The system may be configured to obtain the color correction information by determining pixel values of a portion of the color calibration target in the image. In some embodiments, the system may be configured to determine pixel values of a color in the color calibration target (e.g., color calibration card as illustrated in FIG. 9). For example, the system may determine pixel values of the color red, orange, yellow, green, blue, indigo, violet, or another color. In some embodiments, the system may be configured to determine pixel values of a color by identifying a portion of the color calibration target associated with the color. For example, the system may identify a rectangular region of the color calibration target that is of the color.

Next, process 810 proceeds to block 816, where the system corrects color of at least one of the plurality of images using the color correction information. In some embodiments, the system may be configured to adjust pixel values of the images using the color correction information. The system may be configured to determine a color correction that optimizes the pixel values of the identified pixels based on a target pixel value. For example, the system may optimize the RGB values of the pixels associated with a gray color in a color calibration card based on the target pixel value. In one example implementation, the system may use Brent's method of optimization as described in Brent, R. P., Ch. 3-4 in *Algorithms for Minimization Without Derivatives*. Englewood Cliffs, N.J.: Prentice-Hall, 1973. In some embodiments, the system may be configured to perform a binary search to determine pixel values of the image(s). In some embodiments, the system may be configured to perform an iterative optimization. The system may be configured to limit the number of iterations performed. For example, the system may have a limit of 5, 10, 15, 20, 25, 30, 35, 40, 45, 50, 100, 150, or 200 iterations in which to optimize.

Next, process 810 proceeds to block 818, where the system generates a 3D model of the physical object. In some embodiments, the system may be configured to render the 3D model of the physical object by modeling a structure of the physical object determined from the images. For example, the system may use triangulation to identify 3D points of the object using the multiple images. In some embodiments, the system may be configured to use the color corrected images of the physical object to generate the 3D model. The system may be configured to use the color corrected images to determine information about a structure of the image, physical features, and/or color. The system may be configured to use the determined information to generate the 3D model. In some embodiments, the system may be configured to use 3D modelling software (e.g., AUTODESK) to generate the 3D model of the physical object using the images.

Figure 10:
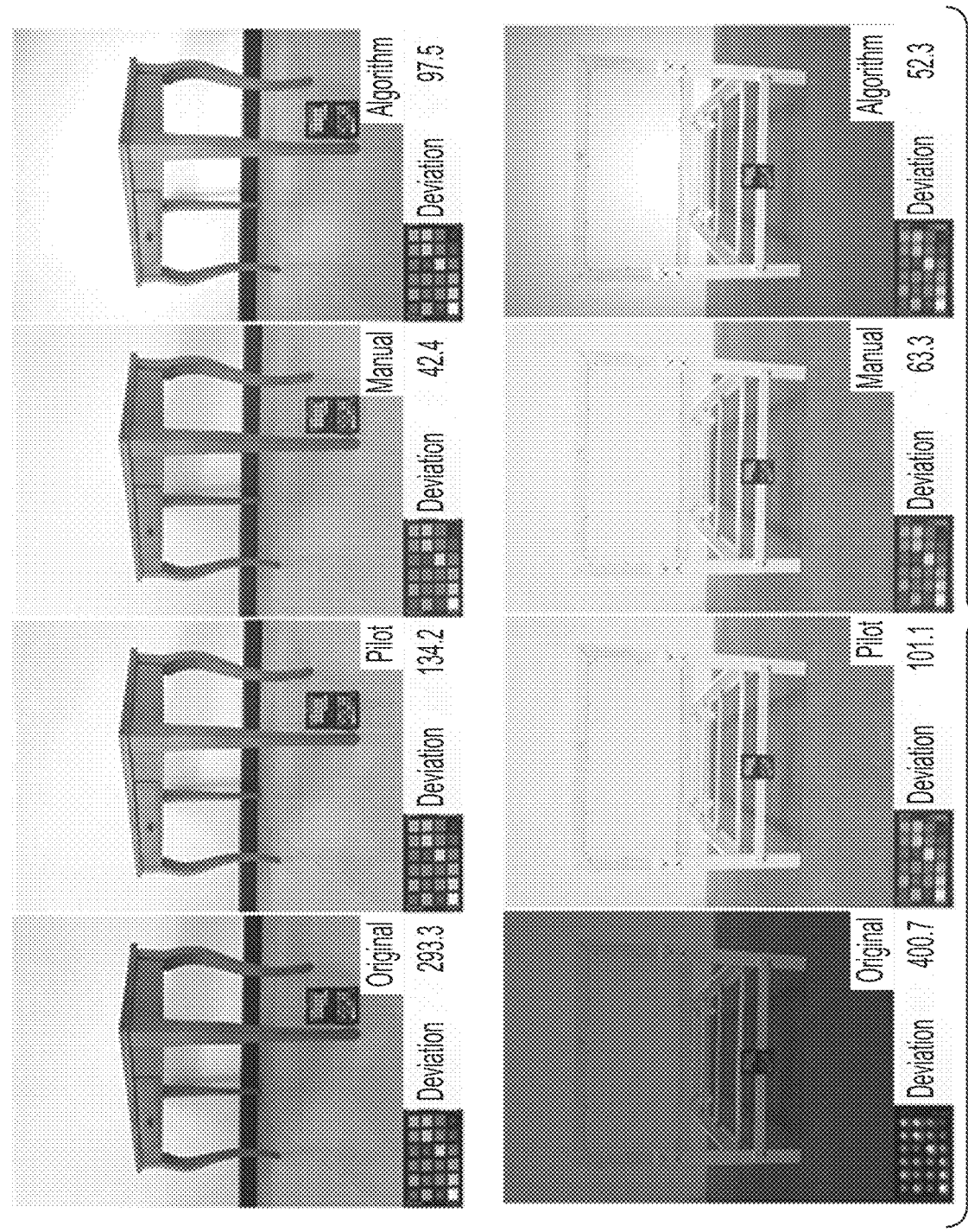
FIG. 10 is an illustration of a result of color calibration performed on two images, according to some embodiments of the technology described herein.

FIG. 10 is an illustration of a result of color calibration performed on two images, according to some embodiments of the technology described herein. The first set of images (the top row shown in FIG. 10) shows, starting from the left: a first image of a table, a result of color correction of the first image obtained using the PILOT software application, a result of color correction of the first image performed manually, and a result of color correction of the first image obtained by performing process 800. The second set of images (the bottom row shown in FIG. 10) shows, starting from the left: a second image of a bed frame, a result of color correction of the second image obtained using the PILOT software application, a result of color correction of the second image performed manually, and a result of color correction of the second image obtained by performing process 800. The number associated with each image indicates (labelled "Deviation") is a score indicating a deviation of the image's pixel values from a target pixel value. For example, the score may be a root mean square (RMS) value determined by comparing pixel values (e.g., RGB values) to target pixel values (e.g., of a portion of the color calibration target). As an illustrative example, for a pixel in an image detected to be red, an average of a window (e.g., a 3×3 window) around the pixel is calculated and compared to a target pixel value of the color red.

As shown in FIG. 10, for the first image, the original has a score of 293.3, the color correction obtained using the PILOT software application has a score of 134.2, the manual color correction has a score of 42.4, and the color correction obtained by performing process 800 has a score of 97.5. For the second image, the original has a score of 400.7, the color correction obtained using the PILOT software application has a score of 101.1, the manual color correction has a score of 63.3, and the color correction obtained by performing process 800 has a score of 52.3. Accordingly, some embodiments may improve the quality of images (e.g., used for generation of 3D models) by providing color corrected images that may reflect physical appearance of a physical object.

FIG. 11 shows a block diagram of an example computer system 1100 that may be used to implement embodiments of the technology described herein. The computing device 1100 may include one or more computer hardware processors 1102 and non-transitory computer-readable storage media (e.g., memory 1104 and one or more non-volatile storage devices 1106). The processor(s) 1102 may control writing data to and reading data from (1) the memory 1104; and (2) the non-volatile storage device(s) 1106. To perform any of the functionality described herein, the processor(s) 1102 may execute one or more processor-executable instructions stored in one or more non-transitory computer-readable storage media (e.g., the memory 1104), which may serve as non-transitory computer-readable storage media storing processor-executable instructions for execution by the processor(s) 1102.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

As used in herein, doing Y "in response to" X, means not only doing Y after X, but as a result of X. In some embodiments, performing Y in response to X comprises performing Y within a threshold of time of having completed performance of X. For example, performing Y in response to X comprises performing Y within 5 seconds, within 1 second, within 0.1 seconds, within 0.01 seconds, and/or within 0.001 seconds of X. In some embodiments, performing Y "in response to" X may comprise performing Y within any threshold of time of X to provide the user with an impression of "real-time" performance.

Having described several embodiments of the techniques described herein in detail, various modifications and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A mobile device, comprising:
   at least one camera;
   at least one computer hardware processor; and
   at least one non-transitory computer-readable storage medium storing processor-executable instructions that, when executed by the at least one computer hardware processor, cause the at least one computer hardware processor to perform a method for guiding a user, via an interface generated by the mobile device, to capture a plurality of images of a physical object using the mobile device, the method comprising:
      obtaining boundary information indicative of a boundary enclosing the physical object;
      determining, using the boundary information, a plurality of positions from which the user is to capture the plurality of images, the plurality of positions including a first position from which the user is to capture a first image of the plurality of images;
      guiding, using the interface, the user to capture the plurality of images, the guiding comprising:
         guiding the user to the first position using the interface; and
         enabling the user to capture the first image at the first position when a determination is made that the user can capture the first image; and
      outputting the plurality of images.

2. The mobile device of claim 1, wherein obtaining the boundary information comprises:
   obtaining information specifying a box enclosing the physical object based on input provided by the user via the interface.

3. The mobile device of claim 2, wherein obtaining the information specifying the box enclosing the physical object comprises:
   obtaining first input indicative of locations of multiple corners of the box, the first input specified by the user tapping multiple respective locations shown in the interface; and
   obtaining second input indicative of a height for the box, the second input specified by the user using a slider shown in the interface.

4. The mobile device of claim 2, wherein determining the plurality of positions from which the user is to capture the plurality of images comprises:
   determining the first position by determining:
      a first angle using the box; and
      a first distance to the physical object at which to capture the first image.

5. The mobile device of claim 1, wherein the physical object comprises furniture.

6. The mobile device of claim 1, wherein guiding the user to the first position using the interface comprises:
   displaying, in the interface, a visual prompt indicating where the user is to position the mobile device to capture an image from the first position.

7. The mobile device of claim 1,
   wherein guiding the user to the first position using the interface further comprises displaying, in the interface, a visual prompt indicating a first height, above the first position, at which the at least one camera is to be positioned; and wherein the method comprises performing at least one quality control test comprising determining whether the at least one camera is positioned at the first height.

8. The mobile device of claim 1, wherein the method further comprises:
performing at least one quality control test, the at least one quality control test comprising one or more of determining whether the at least one camera is positioned at the first position, determining whether the at least one camera is facing the physical object, determining whether the at least one camera is held at a desired pitch, and determining whether a measure of light intensity is above a threshold.

9. The mobile device of claim 1, wherein enabling the user to capture the first image comprises presenting a selectable element in the interface that, when selected by the user, causes the mobile device to capture the first image.

10. The mobile device of claim 1, wherein the method further comprises:
after the user captures the first image,
determining whether the first image is blurry; and
when it is determined that the first image is blurry, prompting the user via the interface to capture a new image to replace the first image.

11. The mobile device of claim 1, wherein outputting the plurality of images comprises:
transmitting the plurality of images to at least one other computing device.

12. A method for guiding a user, via an interface generated by a mobile device, to capture a plurality of images of a physical object using the mobile device, the method comprising:
obtaining boundary information indicative of a boundary enclosing the physical object;
determining, using the boundary information, a plurality of positions from which the user is to capture the plurality of images, the plurality of positions including a first position from which the user is to capture a first image of the plurality of images;
guiding, using the interface, the user to capture the plurality of images, the guiding comprising:
guiding the user to the first position using the interface; and
enabling the user to capture the first image at the first position when a determination is made that the user can capture the first image; and
outputting the plurality of images.

13. The method of claim 12, wherein obtaining the boundary information comprises:
obtaining information specifying a box enclosing the physical object based on input provided by the user via the interface.

14. The method of claim 13, wherein determining the plurality of positions from which the user is to capture the plurality of images comprises:
determining the first position by determining:
a first angle using the box; and
a first distance to the physical object at which to capture the first image.

15. The method of claim 12, wherein guiding the user to the first position using the interface further comprises displaying, in the interface, a visual prompt indicating a first height, above the first position, at which at least one camera is to be positioned.

16. At least one non-transitory computer-readable storage medium storing processor-executable instructions that, when executed by at least one computer hardware processor of a mobile device, cause the at least one computer hardware processor to perform a method for guiding a user, via an interface generated by the mobile device, to capture a plurality of images of a physical object using the mobile device, the method comprising:
obtaining boundary information indicative of a boundary enclosing the physical object;
determining, using the boundary information, a plurality of positions from which the user is to capture the plurality of images, the plurality of positions including a first position from which the user is to capture a first image of the plurality of images;
guiding, using the interface, the user to capture the plurality of images, the guiding comprising:
guiding the user to the first position using the interface; and
enabling the user to capture the first image at the first position when a determination is made that the user can capture the first image; and
outputting the plurality of images.

17. The at least one non-transitory computer-readable storage medium of claim 16, wherein the method further comprises:
performing at least one quality control test, the at least one quality control test comprising one or more of determining whether at least one camera is positioned at the first position, determining whether the at least one camera is positioned at a first height above the first position, determining whether the at least one camera is facing the physical object, determining whether the at least one camera is held at a desired pitch, and determining whether a measure of light intensity is above a threshold.

18. A mobile device, comprising:
at least one camera;
at least one computer hardware processor; and
at least one non-transitory computer-readable storage medium storing processor-executable instructions that, when executed by the at least one computer hardware processor, cause the at least one computer hardware processor to perform a method for guiding a user, via an interface generated by the mobile device, to capture a plurality of images of a physical object using the mobile device, the method comprising:
obtaining boundary information indicative of a boundary enclosing the physical object;
determining, using the boundary information, a plurality of positions from which the user is to capture the plurality of images, the plurality of positions including a first position from which the user is to capture a first image of the plurality of images;
guiding, using the interface, the user to capture the plurality of images using the mobile device, the guiding comprising:
guiding the user to the first position using the interface, the guiding comprising providing the user with feedback for positioning the mobile device, the feedback generated based on a field of view of the at least one camera; and
outputting the plurality of images.

19. The mobile device of claim 18, wherein obtaining the boundary information comprises:
obtaining information specifying a box enclosing the physical object based on input provided by the user via the interface.

20. The mobile device of claim 19, wherein determining the plurality of positions from which the user is to capture the plurality of images comprises:
  determining the first position by determining:
    a first angle using the box; and
    a first distance to the physical object at which to capture the first image.

21. The mobile device of claim 18, wherein guiding the user to the first position using the interface comprises:
  displaying, in the interface, a visual prompt indicating where the user is to position the mobile device to capture an image from the first position.

22. The mobile device of claim 18,
  wherein guiding the user to the first position using the interface further comprises displaying, in the interface, a visual prompt indicating a first height, above the first position, at which the at least one camera is to be positioned; and
  wherein the method comprises performing at least one quality control test comprising determining whether the at least one camera is positioned at the first height.

23. The mobile device of claim 18, wherein the method further comprises:
  performing at least one quality control test, the at least one quality control test comprising one or more of determining whether the at least one camera is positioned at the first position, determining whether the at least one camera is facing the physical object, determining whether the at least one camera is held at a desired pitch, and determining whether a measure of light intensity is above a threshold; and
  providing the user with the feedback for positioning the mobile device based on a result of the at least one quality control test.

24. The mobile device of claim 18, wherein the method further comprises:
  after the user captures the first image,
    determining whether the first image is blurry; and
    when it is determined that the first image is blurry, prompting the user via the interface to capture a new image to replace the first image.

25. The mobile device of claim 18, wherein outputting the plurality of images comprises:
  transmitting the plurality of images to at least one other computing device.

26. A method for guiding a user, via an interface generated by a mobile device, to capture a plurality of images of a physical object using the mobile device, the method comprising:
  obtaining boundary information indicative of a boundary enclosing the physical object;
  determining, using the boundary information, a plurality of positions from which the user is to capture the plurality of images, the plurality of positions including a first position from which the user is to capture a first image of the plurality of images;
  guiding, using the interface, the user to capture the plurality of images using the mobile device, the guiding comprising:
    guiding the user to the first position using the interface, the guiding comprising providing the user with feedback for positioning the mobile device, the feedback generated based on a field of view of at least one camera; and
  outputting the plurality of images.

27. The method of claim 26, wherein obtaining the boundary information comprises:
  obtaining information specifying a box enclosing the physical object based on input provided by the user via the interface.

28. The method of claim 26, further comprising:
  performing at least one quality control test, the at least one quality control test comprising one or more of determining whether the at least one camera is positioned at the first position, determining whether the at least one camera is positioned at a first height above the first position, determining whether the at least one camera is facing the physical object, determining whether the at least one camera is held at a desired pitch, and determining whether a measure of light intensity is above a threshold; and
  providing the user with the feedback for positioning the mobile device based on a result of the at least one quality control test.

29. At least one non-transitory computer-readable storage medium storing processor-executable instructions that, when executed by at least one computer hardware processor of a mobile device, cause the at least one computer hardware processor to perform a method for guiding a user, via an interface generated by the mobile device, to capture a plurality of images of a physical object using the mobile device, the method comprising:
  obtaining boundary information indicative of a boundary enclosing the physical object;
  determining, using the boundary information, a plurality of positions from which the user is to capture the plurality of images, the plurality of positions including a first position from which the user is to capture a first image of the plurality of images;
  guiding, using the interface, the user to capture the plurality of images using the mobile device, the guiding comprising:
    guiding the user to the first position using the interface, the guiding comprising providing the user with feedback for positioning the mobile device, the feedback generated based on a field of view of at least one camera; and
  outputting the plurality of images.

30. The at least one non-transitory computer-readable storage medium of claim 29, wherein the method further comprises:
  performing at least one quality control test, the at least one quality control test comprising one or more of determining whether the at least one camera is positioned at the first position, determining whether the at least one camera is positioned at a first height above the first position, determining whether the at least one camera is facing the physical object, determining whether the at least one camera is held at a desired pitch, and determining whether a measure of light intensity is above a threshold; and
  providing the user with the feedback for positioning the mobile device based on a result of the at least one quality control test.

* * * * *